United States Patent
Shimizu et al.

(10) Patent No.: US 9,675,927 B2
(45) Date of Patent: Jun. 13, 2017

(54) METHOD FOR HYDROGEN PRODUCTION BY PRESSURE SWING ADSORPTION

(71) Applicant: Osaka Gas Co., Ltd., Osaka-shi (JP)

(72) Inventors: Tsubasa Shimizu, Osaka (JP); Koichiro Ikeda, Osaka (JP); Shota Kawashima, Osaka (JP); Yukio Hiranaka, Osaka (JP); Satoshi Mori, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 0 days.

(21) Appl. No.: 14/905,571

(22) PCT Filed: Jul. 17, 2014

(86) PCT No.: PCT/JP2014/069066
§ 371 (c)(1),
(2) Date: Jan. 15, 2016

(87) PCT Pub. No.: WO2015/008837
PCT Pub. Date: Jan. 22, 2015

(65) Prior Publication Data
US 2016/0175761 A1 Jun. 23, 2016

(30) Foreign Application Priority Data

Jul. 19, 2013 (JP) .................................. 2013-150798
Mar. 17, 2014 (JP) .................................. 2014-053883

(51) Int. Cl.
*B01D 53/047* (2006.01)
*B01D 53/053* (2006.01)
*C01B 3/56* (2006.01)

(52) U.S. Cl.
CPC ....... *B01D 53/0476* (2013.01); *B01D 53/047* (2013.01); *C01B 3/56* (2013.01); *B01D 53/053* (2013.01); *B01D 2253/104* (2013.01); *B01D 2253/108* (2013.01); *B01D 2256/16* (2013.01); *B01D 2257/504* (2013.01);
(Continued)

(58) Field of Classification Search
CPC B01D 53/047; B01D 53/0476; B01D 53/053; B01D 2253/104; B01D 2253/108; B01D 2256/16; B01D 2257/504; B01D 2257/7025; B01D 2257/80;
(Continued)

(56) References Cited

U.S. PATENT DOCUMENTS 4,915,711 A * 4/1990 Kumar ............... B01D 53/0476
95/101
6,007,606 A * 12/1999 Baksh .................. B01D 53/053
95/101
(Continued)

FOREIGN PATENT DOCUMENTS

JP 10212102 A 8/1998
JP 2000317245 A 11/2000
(Continued)

*Primary Examiner* — Frank Lawrence
(74) *Attorney, Agent, or Firm* — The Webb Law Firm

(57) ABSTRACT

A method for hydrogen production by pressure swing adsorption that can increase the recovery efficiency of an adsorption target component while enabling an off-gas to be appropriately supplied to a combustion device is provided that can achieve a cost reduction and an increase in the efficiency of the combustion operation.

17 Claims, 13 Drawing Sheets

(52) U.S. Cl.
CPC .. *B01D 2257/7025* (2013.01); *B01D 2257/80* (2013.01); *B01D 2259/404* (2013.01); *B01D 2259/40035* (2013.01); *B01D 2259/414* (2013.01); *C01B 2203/042* (2013.01)

(58) Field of Classification Search
CPC .... B01D 2259/40035; B01D 2259/404; B01D 2259/414; C01B 3/56; C01B 2203/043
USPC ..... 95/96–98, 102, 103, 117, 130, 139, 140, 95/143
See application file for complete search history.

(56) References Cited

U.S. PATENT DOCUMENTS

2008/0282883 A1* 11/2008 Rarig .................. B01D 53/047
    95/96
2009/0320679 A1* 12/2009 Baksh ................ B01D 53/0462
    95/100

FOREIGN PATENT DOCUMENTS

| | | |
|---|---|---|
| JP | 200110806 A | 1/2001 |
| JP | 2002355522 A | 12/2002 |
| JP | 2005289704 A | 10/2005 |
| JP | 2005293949 A | 10/2005 |

* cited by examiner

Fig.2

| | First phase | Second phase | Third phase | Fourth phase | Fifth phase |
|---|---|---|---|---|---|
| Column A (adsorption step) | Adsorption step | | | | |
| Column B (pressure-restoring step) | Upstream receiving step | | Pressure-increasing step | | |
| Column C (desorption step) | First pressure-reducing step | Second pressure-reducing step | Tank suction step | Pump suction step | Suspended |
| Column D (pressure-equalization discharge step) | Upstream discharge step | | Suspended | | Downstream receiving step / Downstream discharge step |

Unit processing period

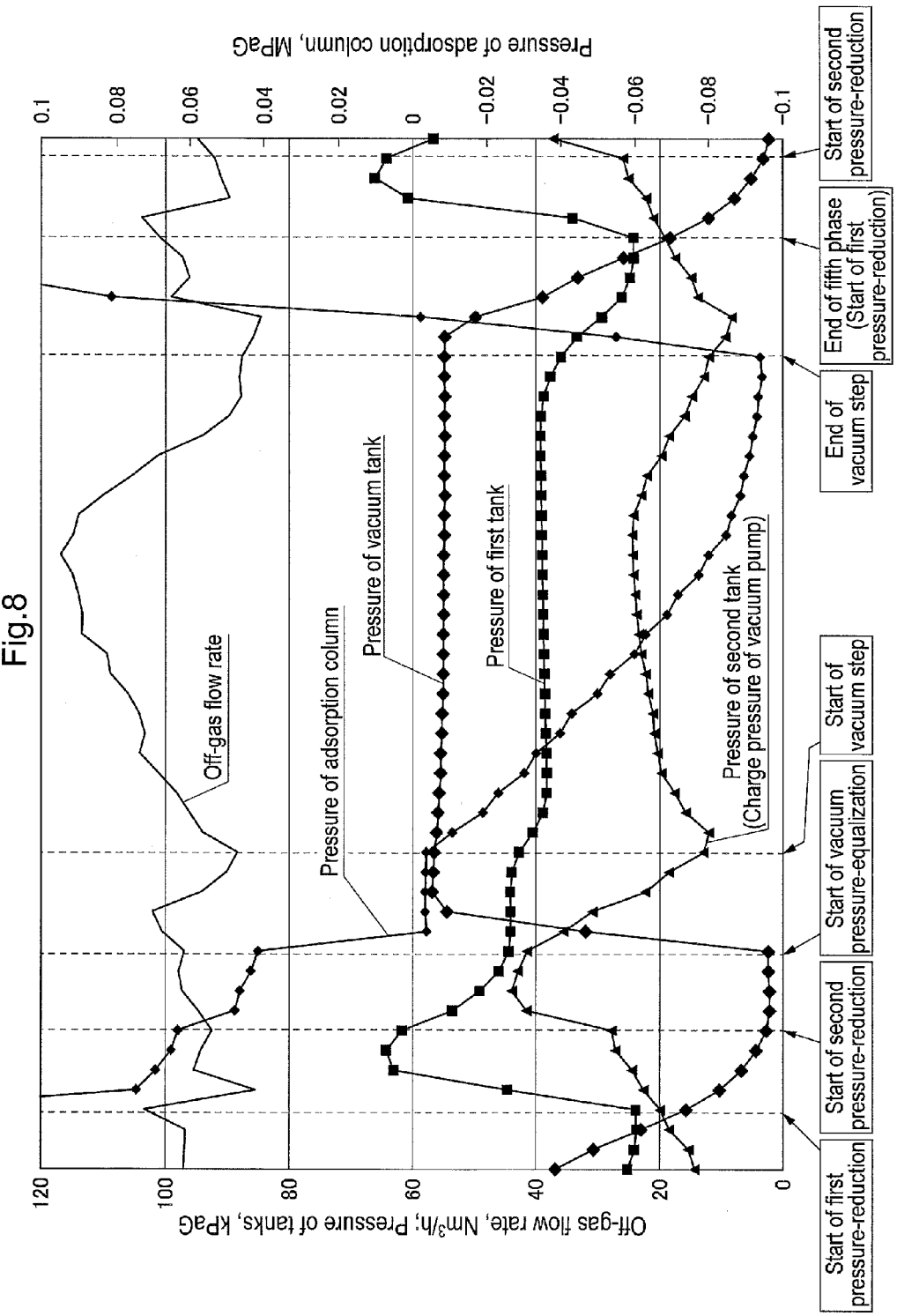

Fig.9

| | First phase | Second phase | | Third phase | Fourth phase | Fifth phase |
|---|---|---|---|---|---|---|
| Column A (adsorption step) | Adsorption step | | | | | |
| Column B (pressure-restoring step) | Upstream receiving step | | | Pressure-increasing step | | Suspended |
| Column C (desorption step) | Pressure-reducing step | Tank suction step | | Pump suction step | | Downstream receiving step |
| Column D (pressure-equalization discharge step) | Upstream discharge step | | | Suspended | | Downstream discharge step |

Unit processing period

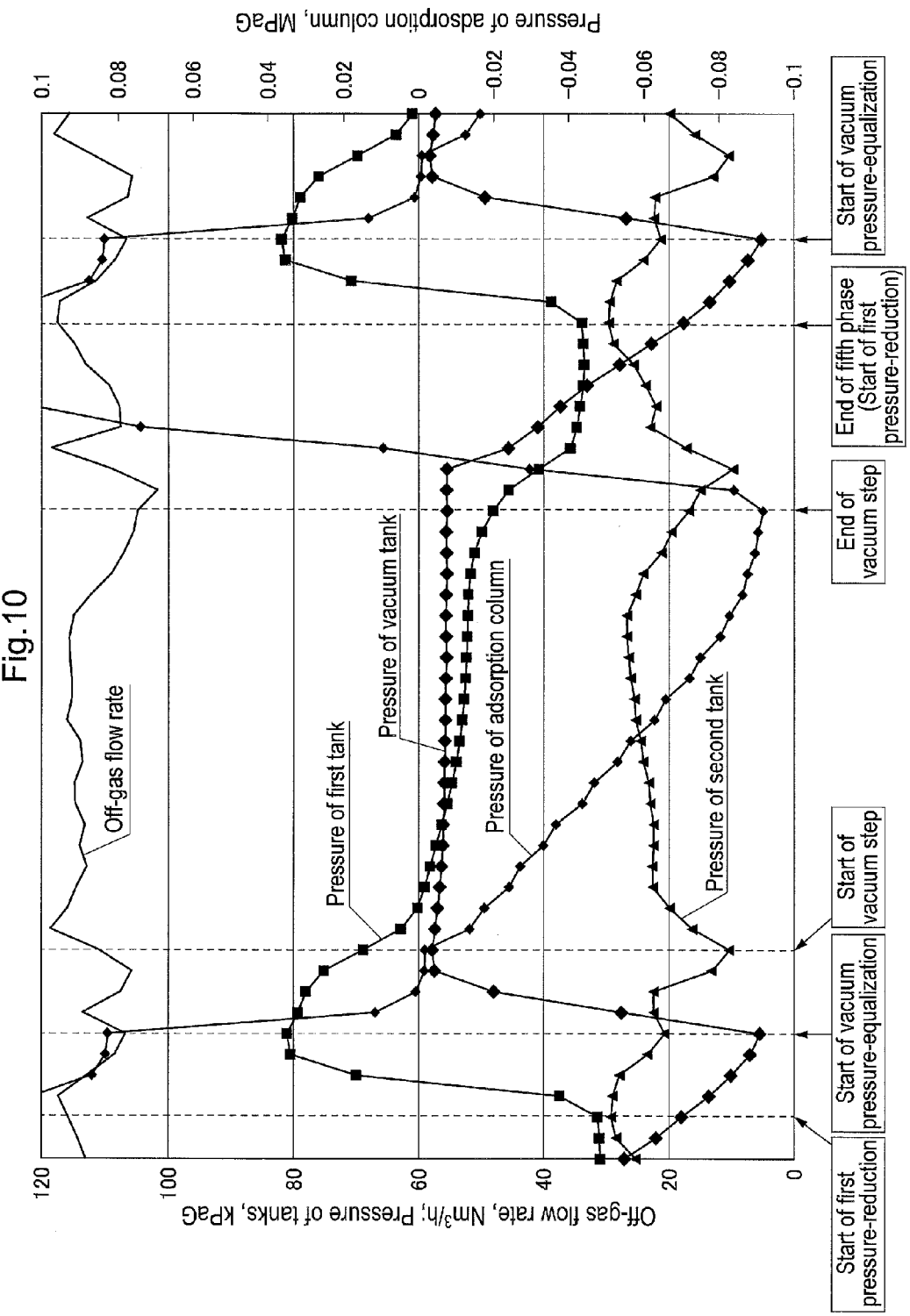

METHOD FOR HYDROGEN PRODUCTION BY PRESSURE SWING ADSORPTION

CROSS-REFERENCE TO RELATED APPLICATIONS

This application is the United States national phase of International Application No. PCT/JP2014/069066 filed Jul. 17, 2014, and claims priority to Japanese Patent Application Nos. 2013-150798 and 2014-053883, filed Jul. 19, 2013 and Mar. 17, 2014, respectively, the disclosures of which are hereby incorporated in their entirety by reference.

TECHNICAL FIELD

The present invention relates to a method for hydrogen production by pressure swing adsorption, wherein four adsorption columns for generating a product gas from a feed gas containing a hydrogen component and a flammable component other than the hydrogen component by causing an adsorption target component other than the hydrogen component to be adsorbed onto an adsorbent, and an off-gas tank into which an off-gas discharged from the adsorption columns is recovered and from which the recovered off-gas is supplied to a combustion device are provided, and wherein an adsorption step is performed for a unit processing period in one of the four adsorption columns, a pressure-equalization discharge step is performed for the unit processing period in the adsorption column in which the step subsequent to the adsorption step is performed, a desorption step is performed for the unit processing period in the adsorption column in which the step subsequent to the pressure-equalization discharge step is performed, a pressure-restoring step as a pre-step of the adsorption step is performed for the unit processing period in the adsorption column in which the step subsequent to the desorption step is performed, and the off-gas discharged from the adsorption column in which the desorption step is performed is recovered into the off-gas tank.

BACKGROUND ART

Such a method for hydrogen production by pressure swing adsorption (PSA: Pressure Swing Adsorption) is used to produce a product gas having a high hydrogen concentration from a feed gas containing a hydrogen component and a flammable component other than the hydrogen component by causing an adsorption target component other than the hydrogen component, of the feed gas, to be adsorbed onto the adsorbent. Moreover, since the off-gas discharged from the adsorption columns contains the flammable component, a configuration is adopted in which the off-gas recovered into the off-gas tank is supplied to the combustion device and burnt therein.

A conventional example of such a method for hydrogen production by pressure swing adsorption is a method in which a product gas is produced using a reformed gas as the feed gas, the reformed gas being supplied from a reformer for reforming town gas, the product gas is then supplied to a fuel cell, and the off-gas is supplied to a combustion device for heating the reformer (see Patent Document 1, for example).

In the method for hydrogen production by pressure swing adsorption of Patent Document 1, a blowing step of discharging a gas inside the adsorption column in the desorption step into the off-gas tank as the off-gas and a purging step of causing a gas inside the adsorption column in the pressure-equalization discharge step to flow through the adsorption column in the desorption step and to be discharged into the off-gas tank as the off-gas are performed successively as the desorption step.

Incidentally, although not described in Patent Document 1, there are cases where, in the purging step, a portion of the product gas supplied from the adsorption column in the adsorption step is caused to flow through the adsorption column in the desorption step and to be discharged into the off-gas tank as the off-gas.

PRIOR ART DOCUMENTS

Patent Documents

Patent Document 1: JP 2002-355522A

SUMMARY OF THE INVENTION

Problem to be Solved by the Invention

With respect to methods for hydrogen production by pressure swing adsorption, in the desorption step, it is desirable to increase recovery efficiency of the adsorption target component by causing the adsorption target component adsorbed onto the adsorbent of the adsorption column in the desorption step to be accurately released therefrom.

To achieve this, a method for hydrogen production by pressure swing adsorption is conceivable in which it is attempted to achieve the accurate release of the adsorption target component by providing a vacuum pump that performs suctioning with respect to the adsorption column in the desorption step. However, with this method, there is a risk that the off-gas cannot be appropriately supplied to the combustion device.

That is to say, the inventor of the present application conceived the method for hydrogen production by pressure swing adsorption in which suctioning of the adsorption column in the desorption step is performed using the vacuum pump, but found that there is a risk that the off-gas cannot be appropriately supplied to the combustion device by simply performing suctioning of the adsorption column using the vacuum pump.

Hereinafter, the risk that the off-gas cannot be appropriately supplied to the combustion device in the case of a method for hydrogen production by pressure swing adsorption in which a vacuum pump is used will be described in detail while specifically describing the method for hydrogen production by pressure swing adsorption (hereinafter referred to as the "comparative method") devised by the inventor of the present application. It should be noted that the comparative method is not publicly known at the filing of the present application.

As shown in FIG. 11, columns A, B, C, and D are provided as four adsorption columns 1. A feed gas supply path 3 through which a feed gas G compressed by a compressor 2 is supplied and an off-gas discharge path 4 through which an off-gas is discharged are connected to lower portions of the four adsorption columns 1.

Moreover, feed gas supply valves A1, B1, C1, and D1 that open and close the feed gas supply path 3 and off-gas discharge valves A5, B5, C5, and D5 that open and close the off-gas discharge path 4 are provided respectively corresponding to the four adsorption columns 1.

It should be noted that a main gas valve 3A that is closed when the operation for producing hydrogen gas is stopped is provided at a location on the feed gas supply path 3 that is downstream of the compressor 2.

A product gas delivery path 5 through which a product gas H is delivered, a return path 6 which diverges from the product gas delivery path 5 and through which a portion of the product gas H flowing through the product gas delivery path 5 is returned to the adsorption columns 1, and a column-communication path 7 for connecting the four adsorption columns 1 in communication with one another are connected to upper portions of the four adsorption columns 1.

Moreover, product gas delivery valves A2, B2, C2, and D2 that open and close the product gas delivery path 5, product gas return valves A3, B3, C3, and D3 that open and close the return path 6, and communication on-off valves A4, B4, C4, and D4 that open and close the column-communication path 7 are provided respectively corresponding to the four adsorption columns 1.

An off-gas tank T into which the off-gas is recovered and from which the recovered off-gas is supplied to a burner 8 serving as a combustion device is provided on the off-gas discharge path 4.

According to this comparative method, a first tank T1 and a second tank T2 are provided as the off-gas tank T, and a tank installation portion of the off-gas discharge path 4 where the off-gas tank T is installed includes a first discharge path 4a and a second discharge path 4b that are provided in parallel to each other. The first tank T1 is placed on the first discharge path 4a, and the second tank T2 is placed on the second discharge path 4b.

A pump placement flow path 9 is provided connecting a point on the off-gas discharge path 4 that is upstream of the tank installation portion to a point on the second discharge path 4b that is upstream of the second tank T2. A vacuum pump P is placed on this pump placement flow path 9.

Moreover, a first shut-off valve V1 is installed in a portion of the off-gas discharge path 4 that is upstream of the vacuum pump P placed on the pump placement flow path 9, a second shut-off valve V2 is installed in a portion of the first discharge path 4a that is upstream of the first tank T1, and a third shut-off valve V3 is installed in a portion of the second discharge path 4b that is upstream of the connecting point of the pump placement flow path 9.

Accordingly, when the second shut-off valve V2, of the first to third shut-off valves V1 to V3, is opened, and the other shut-off valves are closed, as illustrated in FIG. 13, a first flowing state in which the off-gas from the adsorption column 1 is supplied to the burner 8 while being recovered into the first tank T1 can be created.

When the third shut-off valve V3, of the first to third shut-off valves V1 to V3, is opened, and the other shut-off valves are closed, as illustrated in FIG. 14, a second flowing state in which the off-gas from the adsorption column 1 is supplied to the burner 8 while being recovered into the second tank T2 can be created.

When the first shut-off valve V1, of the first to third shut-off valves V1 to V3, is opened, and the other shut-off valves are closed, as illustrated in FIG. 15, a third flowing state in which the vacuum pump P performs suctioning of the adsorption column 1, and the off-gas that is thus supplied by the vacuum pump P is supplied to the burner 8 while being recovered into the second tank T2 can be created.

A first flow control valve R1 is installed in a portion of the first discharge path 4a that is downstream of the first tank T1, and a second flow control valve R2 is installed in a portion of the second discharge path 4b that is downstream of second tank T2. Excessive increases and decreases in the flow rate of the off-gas supplied to the burner 8 can be suppressed by the flow control of the first flow control valve R1 and the second flow control valve R2.

That is to say, in the first flowing state, the off-gas flow rate is controlled by the first flow control valve R1, and in the second flowing state and the third flowing state, basically the off-gas flow rate is controlled by the second flow control valve R2, and when the off-gas flow rate is insufficient, the first flow control valve R1 is controlled so as to supplement the off-gas recovered into the first tank T1.

In the comparative method, an operating cycle illustrated in FIG. 12 is used.

Incidentally, an adsorption step is performed for a unit processing period in one of the four adsorption columns 1, a pressure-equalization discharge step is performed for the unit processing period in the adsorption column 1 in which the step subsequent to the adsorption step is performed, a desorption step is performed for the unit processing period in the adsorption column 1 in which the step subsequent to the pressure-equalization discharge step is performed, and a pressure-restoring step, which is a pre-step of the adsorption step, is performed for the unit processing period in the adsorption column 1 in which the step subsequent to the desorption step is performed.

That is to say, in each of the four adsorption columns 1, the adsorption step, the pressure-equalization discharge step, the desorption step, and the pressure-restoring step are performed successively in such a manner as to change to the next step each time the unit processing period has elapsed.

Although the adsorption step, the pressure-equalization discharge step, the desorption step, and the pressure-restoring step are performed successively in each of the four adsorption columns 1 as described above, the following is a description of a case where the adsorption step is performed in the column A, of the four adsorption columns 1, the pressure-restoring step is performed in the column B, the desorption step is performed in the column C, and the pressure-equalization discharge step is performed in the column D.

That is to say, the feed gas supply valve A1 and the product gas delivery valve A2 corresponding to the column A are opened, and the adsorption step is performed in the column A for a unit processing period.

With respect to the pressure-equalization discharge step, in an initial stage of the unit processing period, an upstream discharge step of supplying the gas inside the column D in the pressure-equalization discharge step to the column B in the pressure-restoring step is performed, and in a final stage of the unit processing period, a downstream discharge step of supplying the gas inside the column D in the pressure-equalization discharge step to the column C in the desorption step is performed.

Incidentally, in the upstream discharge step and the downstream discharge step, the communication on-off valves A4, B4, C4, and D4 are selectively opened.

With respect to the desorption step, in the initial stage of the unit processing period, a pressure-reducing step of discharging the gas inside the column C in the desorption step into the off-gas tank T as the off-gas is performed as will be described later. In an intermediate stage of the unit processing period, a pump suction step of performing suctioning of the column C in the desorption step using the vacuum pump P in the above-described third flowing state is performed (see FIG. 15). In the final stage of the unit processing period, a downstream receiving step of receiving the gas supplied from the column D in the pressure-equalization discharge step by the downstream discharge step into the column C in the desorption step is performed (see FIG. 16).

According to the comparative method, as the pressure-reducing step, a first pressure-reducing step (see FIG. 13) in which the column C in the desorption step and the first tank T1 are allowed to communicate with each other in the above-described first flowing state and a second pressure-reducing step (see FIG. 14) in which the column C in the desorption step and the second tank T2 are allowed to communicate with each other in the above-described second flowing state are performed successively. Subsequently, the above-described tank suction step is performed.

With respect to the pressure-restoring step, in the initial stage of the unit processing period, an upstream receiving step of receiving the gas supplied from the column D in the pressure-equalization discharge step by the upstream discharge step into the column B in the pressure-restoring step is performed, and then a pressure-increasing step of receiving a portion of the product gas H generated in the column A in the adsorption step into the column B in the pressure-restoring step is performed.

Incidentally, to perform the pressure-increasing step, the product gas return valve B3 corresponding to the column B, of the product gas return valves A3, B3, C3, and D3, is opened.

Incidentally, according to the comparative method, the unit processing period is divided into first to fifth phases as illustrated in FIG. 12.

The upstream receiving step and the upstream discharge step are performed in the first and second phases, the pressure-increasing step and the pump suction step are performed in the third and fourth phases, the first pressure-reducing step is performed in the first phase, the second pressure-reducing step is performed in the second phase, and the downstream receiving step and the downstream discharge step are performed in the fifth phase.

Moreover, with respect to the pressure-restoring step of the column B, in the fifth phase, the operation is in a suspended state in which no specific step is performed. Similarly, with respect to the pressure-equalization discharge step of the column D, in the third and fourth phases, the operation is in a suspended state in which no specific step is performed.

It should be noted that the temporal lengths of the first to fifth respective phases are not necessarily the same length, and may be set to lengths that are suitable for performing the various steps.

FIG. 17 illustrates changes in pressure of the first tank T1 and the second tank T2, changes in flow rate of the off-gas flowing through the off-gas discharge path 4 toward the burner 8, and changes in pressure of the adsorption column 1 (column C) in the case where the above-described comparative method is performed. Incidentally, the pressure of the second tank T2 corresponds to the discharge pressure of the vacuum pump P.

It should be noted that in FIG. 17, the start of the first pressure-reducing step is described as "start of first pressure-reduction", the start of the second pressure-reducing step is described as "start of second pressure-reduction", the start of the pump suction step is described as "start of vacuum step", and the end of the pump suction step is described as "end of vacuum step".

Incidentally, FIG. 17 illustrates the changes in the case where the internal pressure of the adsorption column 1 in the adsorption step is about 750 kPaG, and the internal pressure of the adsorption column 1 (column C) after the downstream discharge step is performed is about 150 kPaG.

It is shown that the internal pressure (about 150 kPaG) of the adsorption column 1 (column C) at the start of the desorption step decreases from about 150 kPaG to near about 70 kPaG after the first pressure-reducing step is performed, the internal pressure of the adsorption column 1 (column C) decreases to near the atmospheric pressure (on the order of about 10 kPaG) after the second pressure-reducing step is performed, and the internal pressure of the adsorption column 1 (column C) decreases to near about −90 kPaG after the pump suction step is performed.

In FIG. 17, when attention is focused on the changes in the amount of off-gas, it can be seen that after the start of the pump suction step, the amount of off-gas sharply increases, and in a final stage of the fifth phase of the unit processing period, the amount of off-gas becomes excessively small.

The amount of off-gas sharply increases as a result of the start of the pump suction step because the vacuum pump P performs suctioning with respect to the adsorption column 1 (column C) in a state in which the internal pressure of the adsorption column 1 (column C) is higher than the atmospheric pressure (on the order of about 10 kPaG).

Moreover, the amount of off-gas becomes excessively small in the final stage of the fifth phase of the unit processing period because no off-gas is supplied to the first tank T1 and the second tank T2 even though the amount of off-gas recovered into the first tank T1 and the second tank T2 decreases.

That is to say, while the amount of off-gas recovered into the first tank T1 and the second tank T2 decreases, the off-gas recovered into the first tank T1 and the second tank T2 is supplied to the burner 8. Thus, the amount of off-gas becomes excessively small in the final stage of the fifth phase of the unit processing period.

In addition, when the amount of off-gas sharply increases as a result of the start of the pump suction step or when the amount of off-gas becomes excessively small in the final stage of the fifth phase of the unit processing period, there is a risk that the combustion state of the burner 8 may be unstable.

In short, with the method for hydrogen production by pressure swing adsorption described as the comparative method, there is a risk that the off-gas cannot be appropriately supplied to the combustion device, and thus an improvement is required.

The present invention was made in view of the above-described circumstances, and it is an object thereof to provide a method for hydrogen production by pressure swing adsorption that can increase the recovery efficiency of the adsorption target component while enabling the off-gas to be appropriately supplied to the combustion device.

A method for hydrogen production by pressure swing adsorption according to the present invention is a method for hydrogen production by pressure swing adsorption, comprising:

providing four adsorption columns for generating a product gas from a feed gas containing a hydrogen component and a flammable component other than the hydrogen component by causing an adsorption target component other than the hydrogen component to be adsorbed onto an adsorbent, and an off-gas tank into which an off-gas discharged from the adsorption columns is recovered and from which the recovered off-gas is supplied to a combustion device, and performing an adsorption step for a unit processing period in one of the four adsorption columns, performing a pressure-equalization discharge step for the unit processing period in the adsorption column in which the step subsequent to the adsorption step is performed, performing a desorption step for the unit processing period in the adsorption column in which the step subsequent to the pressure-equalization discharge step is performed, performing a pressure-restoring step as a pre-step of the adsorption step is performed for the unit processing period in the adsorption column in which the step subsequent to the desorption step is performed, and recovering the off-gas discharged from the adsorption column in which the desorption step is performed into the off-gas tank, and a first characteristic method thereof has the following features:

a vacuum pump for supplying the off-gas suctioned from the adsorption column to the combustion device is provided, the vacuum pump being switchable between an adsorption column-operated state in which the vacuum pump performs suctioning with respect to the adsorption column and a tank-operated state in which the vacuum pump performs suctioning with respect to a vacuum tank, the vacuum tank is provided so as to be switchable between a communication state in which the vacuum tank is in communication with the adsorption column and a blocked state in which the communication with the adsorption column is blocked, with respect to the pressure-equalization discharge step, in an initial stage of the unit processing period, an upstream discharge step of supplying a gas inside the adsorption column in the pressure-equalization discharge step to the adsorption column in the pressure-restoring step is performed, and in a final stage of the unit processing period, a downstream discharge step of supplying the gas inside the adsorption column in the pressure-equalization discharge step to the adsorption column in the desorption step is performed, in the final stage of the unit processing period, suctioning of the vacuum tank switched to the blocked state is performed using the vacuum pump switched to the tank-operated state, thereby discharging the off-gas in the vacuum tank and adjusting the vacuum tank to a negative pressure state, with respect to the desorption step, in the initial stage of the unit processing period, a pressure-reducing step of discharging a gas inside the adsorption column in the desorption step into the off-gas tank as the off-gas is performed, in an intermediate stage of the unit processing period, a tank suction step of switching the vacuum tank adjusted to the negative pressure state to the communication state and suctioning the gas inside the adsorption column in the desorption step into the vacuum tank and a pump suction step of switching the vacuum tank to the blocked state and performing suctioning of the adsorption column in the desorption step using the vacuum pump switched to the adsorption column-operated state are performed successively, and in the final stage of the unit processing period, a downstream receiving step of receiving the gas supplied from the adsorption column in the pressure-equalization discharge step by the downstream discharge step into the adsorption column in the desorption step is performed, and with respect to the pressure-restoring step, in the initial stage of the unit processing period, an upstream receiving step of receiving the gas supplied from the adsorption column in the pressure-equalization discharge step by the upstream discharge step into the adsorption column in the pressure-restoring step is performed, and then a pressure-increasing step of receiving a portion of the product gas generated in the adsorption column in the adsorption step into the adsorption column in the pressure-restoring step is performed.

That is to say, with respect to the pressure-equalization discharge step, in the initial stage of the unit processing period, the upstream discharge step of supplying the gas inside the adsorption column in the pressure-equalization discharge step to the adsorption column in the pressure-restoring step is performed, and in the final stage of the unit processing period, the downstream discharge step of supplying the gas inside the adsorption column in the pressure-equalization discharge step to the adsorption column in the desorption step is performed.

Moreover, with respect to the pressure-restoring step, in the initial stage of the unit processing period, the upstream receiving step of receiving the gas supplied from the adsorption column in the pressure-equalization discharge step by the upstream discharge step into the adsorption column in the pressure-restoring step is performed, and then, the pressure-increasing step of receiving a portion of the product gas generated in the adsorption column in the adsorption step into the adsorption column in the pressure-restoring step is performed.

In addition, in the final stage of the unit processing period, suctioning of the vacuum tank that has been switched to the blocked state, in which the communication with the adsorption column is blocked, is performed using the vacuum pump that has been switched to the tank-operated state, in which the vacuum pump performs suctioning with respect to the vacuum tank, thereby discharging the off-gas in the vacuum tank and adjusting the vacuum tank to the negative pressure state.

Incidentally, the off-gas that is discharged from the vacuum tank by the vacuum pump performing suctioning is supplied to the combustion device.

Also, with respect to the desorption step, in the initial stage of the unit processing period, the pressure-reducing step of discharging the gas inside the adsorption column in the desorption step into the off-gas tank as the off-gas is performed, in the intermediate stage of the unit processing period, the tank suction step and the pump suction step are performed successively, and in the final stage of the unit processing period, the downstream receiving step of receiving the gas supplied from the adsorption column in the pressure-equalization discharge step by the downstream discharge step into the adsorption column in the desorption step is performed.

The tank suction step of the desorption step is the step in which the vacuum tank that has been adjusted to the negative pressure state by the vacuum pump performing suctioning in the final stage of the unit processing period as described above is switched to the communication state, in which the vacuum tank is in communication with the adsorption column in the desorption step, and the gas inside the adsorption column in the desorption step is suctioned into the vacuum tank. The pump suction step is the step in which the vacuum tank is switched to the blocked state, in which the communication with the adsorption column is blocked, and suctioning of the adsorption column in the desorption step is performed using the vacuum pump that has been switched to the adsorption column-operated state, in which it is in communication with the adsorption column in the desorption step.

Therefore, according to the first characteristic method of the present invention, the off-gas from the adsorption column in the desorption step can be properly supplied to the combustion device.

That is to say, in the initial stage of the unit processing period, the gas inside the adsorption column in the desorption step is discharged into the off-gas tank as the off-gas by the pressure-reducing step of the desorption step, and thus, the off-gas recovered into the off-gas tank can be properly supplied to the combustion device.

In the intermediate stage of the unit processing period, when the tank suction step of the desorption step is performed, the vacuum tank in the negative pressure state performs suctioning with respect to the adsorption column in the desorption step, and thus the off-gas discharged from the adsorption column in the desorption step cannot be supplied to the combustion device. However, a large amount of off-gas has been recovered into the off-gas tank by the pressure-reducing step in the initial stage of the unit processing period. Therefore, the off-gas can be properly supplied to the combustion device by supplying the recovered off-gas to the combustion device.

Moreover, in the intermediate stage of the unit processing period, when the pump suction step of the desorption step is performed, the vacuum pump performs suctioning with respect to the adsorption column in the desorption step. Thus, the off-gas discharged from the adsorption column in the desorption step is supplied to the combustion device. Therefore, the off-gas can be properly supplied to the combustion device.

In the final stage of the unit processing period, when the downstream receiving step of the desorption step is performed, no off-gas is discharged from the adsorption column in the desorption step. However, in this final stage of the unit processing period, suctioning of the vacuum tank that has been switched to the blocked state, in which the communication with the adsorption column is blocked, is performed using the vacuum pump that has been switched to the tank-operated state, in which the vacuum pump performs suctioning with respect to the vacuum tank, thereby discharging the off-gas in the vacuum tank and adjusting the vacuum tank to the negative pressure state. Accordingly, the off-gas that has been recovered into the vacuum tank in the tank suction step is supplied to the combustion device. Therefore, the off-gas can be properly supplied to the combustion device.

Moreover, in the intermediate stage of the unit processing period, the pump suction step is performed after the tank suction step is performed. Thus, at the start of the pump suction step, the internal pressure of the adsorption column in the desorption step can be adjusted to a pressure that is lower than the atmospheric pressure by the previously performed tank suction step. Therefore, a sharp increase in the amount of off-gas supplied to the combustion device immediately after the start of the pump suction step can be suppressed, and the off-gas can be properly supplied to the combustion device.

Moreover, according to the first characteristic method of the present invention, in the tank suction step and the pump suction step of the desorption step, suctioning of the inside of the adsorption column in the desorption step is performed to reduce the internal pressure of the adsorption column in the desorption step to a pressure lower than the atmospheric pressure. This enables the adsorption target component adsorbed onto the adsorbent of the adsorption column to be accurately released. Therefore, the recovery efficiency of the adsorption target component can be increased.

In short, according to the first characteristic method of the present invention, it is possible to provide a method for hydrogen production by pressure swing adsorption that can increase the recovery efficiency of the adsorption target component while enabling the off-gas to be appropriately supplied to the combustion device.

A second characteristic method of the method for hydrogen production by pressure swing adsorption of the present invention has the following features in addition to those of the above-described first characteristic method: a first tank and a second tank are provided as the off-gas tank, and as the pressure-reducing step, a first pressure-reducing step in which the adsorption column in the desorption step and the first tank are allowed to communicate with each other and a second pressure-reducing step in which the adsorption column in the desorption step and the second tank are allowed to communicate with each other are performed successively, and the tank suction step is subsequently performed.

That is to say, as the pressure-reducing step of the desorption step, the first pressure-reducing step of recovering the gas inside the adsorption column in the desorption step into the first tank as the off-gas and the second pressure-reducing step of recovering the gas inside the adsorption column in the desorption step into the second tank as the off-gas are performed successively, and the tank suction step is performed subsequently to the second pressure-reducing step.

In this manner, the gas inside the adsorption column in the desorption step is recovered into the first tank and the second tank successively. Therefore, it is possible to appropriately recover the gas inside the adsorption column in the desorption step while avoiding the increase of the capacities of the first tank and the second tank to capacities larger than that in the case where the off-gas is recovered using a single off-gas tank.

A more detailed description is now given of this. The internal pressure of the adsorption column in the desorption step at the start of the pressure-reducing step, or in other words, the internal pressure thereof at the start of the desorption step, is a significantly high pressure (e.g., about 150 kPaG) due to the pressure-equalization discharge step, even though it has been reduced to a pressure lower than the internal pressure (e.g., about 750 kPaG) in the adsorption step.

Accordingly, in the case where the off-gas is recovered into a single off-gas tank until the internal pressure of the adsorption column in the desorption step decreases to a target pressure (e.g., about 40 kPaG) that is higher than the atmospheric pressure, the off-gas tank is required to have a capacity that allows the gas inside the adsorption column in the desorption step to expand to reach the target pressure (e.g., about 40 kPaG) from the high pressure (e.g., about 150 kPaG). For this purpose, the off-gas tank disadvantageously has an excessively large capacity.

According to the second characteristic method of the present invention, the off-gas is recovered into the first tank until the internal pressure of the adsorption column in the desorption step decreases from the initial pressure at the start of the pressure-reducing step (at the start of the desorption step) to a pressure (e.g., about 70 kPaG) that is significantly higher than the atmospheric pressure, and then, the off-gas is recovered into the second tank until the internal pressure of the adsorption column in the desorption step decreases to the target pressure (e.g., about 40 kPaG) that is higher than the atmospheric pressure. Therefore, it is possible to appropriately recover the gas inside the adsorption column in the desorption step while avoiding the increase of the capacities of the first tank and the second tank to large capacities.

In short, according to the second characteristic method of the present invention, it is possible to provide a method for hydrogen production by pressure swing adsorption that not only has the effects of the above-described first characteristic method but also enables the gas inside the adsorption column in the desorption step to be appropriately recovered into the off-gas tank while avoiding the use of a tank having an excessively large capacity as the off-gas tank.

A third characteristic method of the method for hydrogen production by pressure swing adsorption of the present invention has the following feature in addition to those of the above-described second characteristic method: the vacuum pump is configured to supply the off-gas to the second tank.

That is to say, the off-gas discharged from the vacuum pump is temporarily accumulated in the second tank before being supplied to the combustion device, and thus the high-pressure off-gas discharged from the vacuum pump can be adjusted to the gas having a proper and stable pressure. Therefore, the off-gas having the proper and stable pressure is supplied to the combustion device.

In this manner, the off-gas discharged from the vacuum pump is supplied to the combustion device in a state in which the off-gas has a proper and stable pressure. Therefore, the combustion state of the combustion device can be stabilized.

In short, according to the third characteristic method of the present invention, it is possible to provide a method for hydrogen production by pressure swing adsorption that can stabilize the combustion state of the combustion device.

A fourth characteristic method of the method for hydrogen production by pressure swing adsorption of the present invention has the following feature in addition to those of the above-described second or third characteristic method: when the first pressure-reducing step is performed, suctioning of the vacuum tank in the blocked state is performed using the vacuum pump switched to the tank-operated state.

That is to say, when the first pressure-reducing step is performed, suctioning of the vacuum tank that has been switched to the blocked state, in which the communication with the adsorption column is blocked, is performed using the vacuum pump that has been switched to the tank-operated state, in which the vacuum pump performs suctioning with respect to the vacuum tank.

That is to say, in the final stage of the unit processing period, suctioning of the vacuum tank that has been switched to the blocked state is performed using the vacuum pump that has been switched to the tank-operated state, thereby discharging the off-gas in the vacuum tank and adjusting the vacuum tank to the negative pressure state, and also when the first pressure-reducing step in the initial stage of the next unit processing period is subsequently performed, suctioning of the vacuum tank that has been switched to the blocked state using the vacuum pump that has been switched to the tank-operated state is continued.

In this manner, in addition to the final stage of the unit processing period, when the first pressure-reducing step in the initial stage of the next unit processing period is performed, suctioning of the vacuum tank that has been switched to the blocked state using the vacuum pump that has been switched to the tank-operated state is continued. Therefore, it is possible to appropriately perform the tank suction step by accurately adjusting the vacuum tank to the negative pressure state.

In short, according to the fourth characteristic method of the present invention, it is possible to provide a method for hydrogen production by pressure swing adsorption that not only has the effects of the above-described second or third characteristic method but also can make it possible to appropriately perform the tank suction step by accurately adjusting the vacuum tank to the negative pressure state.

A fifth characteristic method of the method for hydrogen production by pressure swing adsorption of the present invention has the following features in addition to those of the above-described first characteristic method: an internal pressure of the adsorption column in the desorption step is reduced from an initial pressure at the start of the desorption step to a pressure between 40 and 60% of the initial pressure by the pressure-reducing step, and the tank suction step is performed subsequently to the pressure-reducing step.

That is to say, the internal pressure of the adsorption column in the desorption step is reduced by the pressure-reducing step from the initial pressure at the start of the desorption step to a pressure between 40 and 60% of the initial pressure, and the tank suction step is performed subsequently to the pressure-reducing step.

For example, in the case where the initial pressure is 150 kPaG, the internal pressure of the adsorption column in the desorption step is reduced to 60 to 90 kPaG by the pressure-reducing step, and then the internal pressure of the adsorption column in the desorption step is reduced to a negative pressure state in which the internal pressure is lower than the atmospheric pressure by the tank suction step.

In this manner, the internal pressure of the adsorption column in the desorption step is reduced by the pressure-reducing step from the initial pressure at the start of the desorption step to a pressure between 40 and 60% of the initial pressure. Therefore, it is possible to appropriately perform the tank suction step while avoiding the increase of the capacity of the off-gas tank to a large capacity.

That is to say, if the internal pressure of the adsorption column in the desorption step is reduced by the pressure-reducing step to a low pressure such that the initial pressure at the start of the desorption step is reduced by more than 60%, the off-gas tank disadvantageously has an excessively increased capacity.

Moreover, if the internal pressure of the adsorption column in the desorption step is reduced by the pressure-reducing step such that the initial pressure at the start of the desorption step is reduced by less than 40%, an excessive increase of the capacity of the off-gas tank can be avoided, but it is difficult to reduce the internal pressure of the adsorption column in the desorption step to the negative pressure state by the tank suction step.

Incidentally, even in the case where the internal pressure of the adsorption column in the desorption step is reduced by the pressure-reducing step such that the initial pressure at the start of the desorption step is reduced by less than 40%, if a large-capacity vacuum tank and a high-power suction pump are prepared, the internal pressure of the adsorption column in the desorption step can be reduced to the negative pressure state by the tank suction step, but the equipment cost disadvantageously increases.

In short, according to the fifth characteristic method of the present invention, it is possible to provide a method for hydrogen production by pressure swing adsorption that not only has the effects of the above-described first characteristic method but also can make it possible to appropriately perform the tank suction step while avoiding the increase of the capacity of the off-gas tank to a large capacity.

A sixth characteristic method of the method for hydrogen production by pressure swing adsorption of the present invention has the following feature in addition to those of the above-described fifth characteristic method: when the pressure-reducing step is performed, suctioning of the vacuum tank in the blocked state is performed using the vacuum pump switched to the tank-operated state.

That is to say, when the pressure-reducing step is performed, suctioning of the vacuum tank that has been switched to the blocked state, in which the communication with the adsorption column is blocked, is performed using the vacuum pump that has been switched to the tank-operated state, in which the vacuum pump performs suctioning with respect to the vacuum tank.

In other words, in the final stage of the unit processing period, suctioning of the vacuum tank that has been switched to the blocked state is performed using the vacuum pump that has been switched to the tank-operated state, thereby discharging the off-gas in the vacuum tank and adjusting the vacuum tank to the negative pressure state, and when the pressure-reducing step in the initial stage of the next unit processing period is subsequently performed, suctioning of the vacuum tank that has been switched to the blocked state using the vacuum pump that has been switched to the tank-operated state is continued.

In this manner, in addition to the final stage of the unit processing period, when the pressure-reducing step in the initial stage of the next unit processing period is performed, suctioning of the vacuum tank that has been switched to the blocked state using the vacuum pump that has been switched to the tank-operated state is continued. Therefore, it is possible to appropriately perform the tank suction step by accurately adjusting the vacuum tank to the negative pressure state.

In short, according to the sixth characteristic method of the present invention, it is possible to provide a method for hydrogen production by pressure swing adsorption that not only has the effects of the above-described fifth characteristic method but also can make it possible to appropriately perform the tank suction step by accurately adjusting the vacuum tank to the negative pressure state.

A seventh characteristic method of the method for hydrogen production by pressure swing adsorption of the present invention has the following features in addition to those of the above-described fifth or sixth characteristic method: a first tank that, in the pressure-reducing step, is connected to the adsorption column in the desorption step and a second tank are provided as the off-gas tank, and the vacuum pump is configured to supply the off-gas to the second tank.

That is to say, the first tank and the second tank are provided as the off-gas tank. In the pressure-reducing step, the first tank is connected to the adsorption column in the desorption step and recovers the off-gas. The vacuum pump supplies the off-gas to the second tank.

In this manner, the off-gas from the adsorption column in the desorption step is recovered into the first tank in the pressure-reducing step, and thus the off-gas can be appropriately recovered in a state in which the internal pressure of the adsorption column in the desorption step is reduced by the pressure-reducing step from the initial pressure at the start of the desorption step to a pressure between 40 and 60% of the initial pressure.

Moreover, since the off-gas discharged from the vacuum pump is temporally accumulated in the second tank before being supplied to the combustion device, the high-pressure off-gas discharged from the vacuum pump can be adjusted to the gas having a proper and stable pressure. Thus, the off-gas having the proper and stable pressure is supplied to the combustion device, and therefore the combustion state of the combustion device can be stabilized.

In short, according to the seventh characteristic method of the present invention, it is possible to provide a method for hydrogen production by pressure swing adsorption that not only has the effects of the above-described fifth or sixth characteristic method but also can make it possible to appropriately recover the off-gas in the pressure-reducing step and furthermore can stabilize the combustion state of the combustion device.

An eighth characteristic method of the method for hydrogen production by pressure swing adsorption of the present invention has the following feature in addition to those of any one of the above-described first to seventh characteristic methods: the vacuum tank is packed with an off-gas adsorbent that adsorbs the off-gas discharged from the adsorption column.

That is to say, the vacuum tank is repeatedly switched between the state in which the a low pressure is created in the vacuum tank by suctioning of the vacuum tank by the vacuum pump and the state in which a high pressure is created in the vacuum tank by introduction of the off-gas from the adsorption column into the vacuum tank. Thus, when the off-gas adsorbent is packed in the vacuum tank, the off-gas discharged from the adsorption column is adsorbed onto the off-gas adsorbent when introduced into the vacuum tank.

Then, the off-gas adsorbed onto the off-gas adsorbent is released from the off-gas adsorbent and discharged from the vacuum tank when the vacuum pump performs suctioning of the vacuum tank.

In this manner, the off-gas discharged from the adsorption column is stored in the vacuum tank in a state in which the off-gas is adsorbed onto the off-gas adsorbent. Thus, even when the capacity of the vacuum tank is reduced as compared with the case where no off-gas adsorbent is packed in the vacuum tank, a predetermined amount of off-gas can be stored in the vacuum tank. Therefore, the size of the vacuum tank can be reduced.

In short, according to the eighth characteristic method of the present invention, it is possible to provide a method for hydrogen production by pressure swing adsorption that not only has the effects of the above-described first to seventh characteristic methods but also can reduce the size of the vacuum tank.

A ninth characteristic method of the method for hydrogen production by pressure swing adsorption of the present invention has the following features in addition to those of the above-described eighth characteristic method:

the feed gas is generated by reforming a gas to be processed containing methane as a main component so that the feed gas contains a hydrogen component as well as methane as a flammable component other than the hydrogen component, carbon monoxide, nitrogen, carbon dioxide, and moisture, the adsorbent packed in the adsorption columns is configured to contain zeolite that adsorbs carbon monoxide and nitrogen, a carbon molecular sieve that adsorbs methane and carbon dioxide, and activated alumina that adsorbs moisture, and the off-gas adsorbent is a carbon molecular sieve that adsorbs methane and carbon dioxide.

That is to say, since the feed gas contains the hydrogen component as well as methane as the flammable component other than the hydrogen component, carbon monoxide, nitrogen, carbon dioxide, and moisture, the adsorbent packed in the adsorption column is configured to contain zeolite that adsorbs carbon monoxide and nitrogen, a carbon molecular sieve that adsorbs methane and carbon dioxide, and activated alumina that adsorbs moisture. Thus, the adsorption target components other than hydrogen can be appropriately adsorbed onto the adsorbent. Therefore, a product gas having a high hydrogen concentration can be accurately produced.

Moreover, considering that if the feed gas is generated by reforming a gas to be processed containing methane as a main component, the off-gas contains a large amount of methane and carbon dioxide, the carbon molecular sieve that adsorbs methane and carbon dioxide is used as the off-gas adsorbent packed in the vacuum tank. Therefore, the off-gas adsorbent packed in the vacuum tank can be simplified.

In short, according to the ninth characteristic method of the present invention, it is possible to provide a method for hydrogen production by pressure swing adsorption that can simplify the off-gas adsorbent packed in the vacuum tank.

BRIEF DESCRIPTION OF DRAWINGS

FIG. 2 is a diagram illustrating an operating cycle.

FIG. 8 is graph illustrating changes in off-gas flow rate, changes in pressure of an adsorption column, and the like.

FIG. 9 is a diagram illustrating an operating cycle according to another embodiment.

FIG. 10 is graph illustrating changes in off-gas flow rate, changes in pressure of an adsorption column, and the like according to the other embodiment.

DETAILED DESCRIPTION OF THE INVENTION

Figure 1:
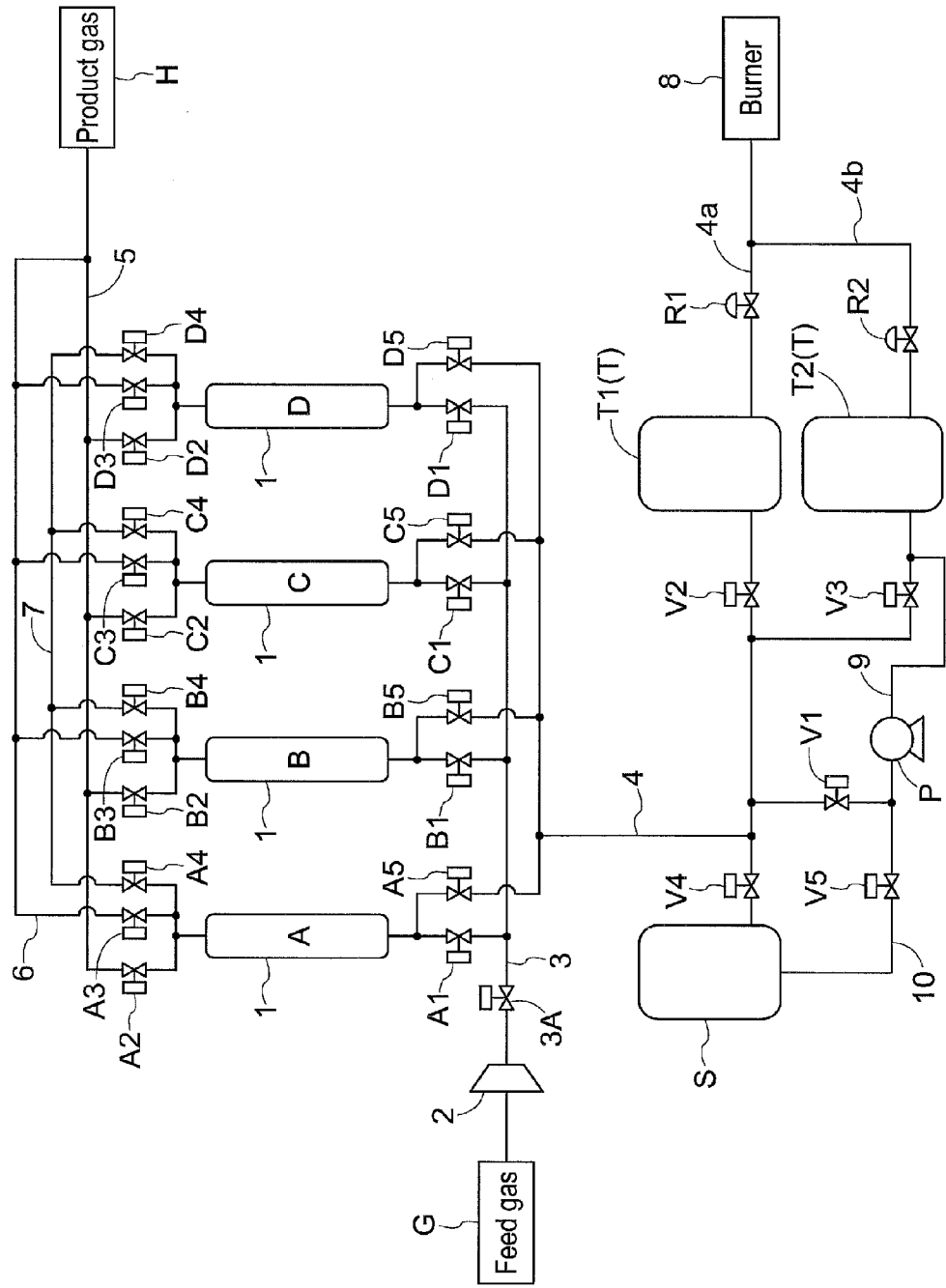
FIG. 1 is a diagram schematically showing an apparatus for performing a method for hydrogen production by pressure swing adsorption.

Hereinafter, embodiments of the present invention will be described based on the drawings.

Overall Configuration of Apparatus for Performing Method for Hydrogen Production by Pressure Swing Adsorption Embodiments of the present invention are improvements of the above-described comparative method. For this reason, components that are the same as those of the above-described comparative method are denoted by the same reference numerals in the drawings, and detailed descriptions thereof are omitted. In the following description, those portions that are different from the comparative method will be described in detail.

Incidentally, a feed gas is a reformed gas that is generated by reforming town gas, which is a gas to be processed containing methane as a main component. The feed gas contains hydrogen as well as methane as a flammable component other than hydrogen gas, carbon dioxide, carbon monoxide, moisture, and nitrogen. Methane, carbon dioxide, carbon monoxide, moisture, and nitrogen are adsorbed onto an adsorbent of the adsorption columns 1 as adsorption target components other than hydrogen.

That is to say, the adsorbent is configured to contain zeolite that adsorbs carbon monoxide and nitrogen, a carbon molecular sieve that adsorbs methane and carbon dioxide, and activated alumina that adsorbs moisture.

As shown in FIG. 1, similarly to the above-described comparative method, the columns A, B, C, and D are provided as the four adsorption columns 1, the first tank T1 and the second tank T2 having a smaller capacity than the first tank T1 are provided as the off-gas tank T, and the vacuum pump P is provided.

Moreover, in the present embodiment, a tank placement flow path 10 is provided connecting a portion of the off-gas discharge path 4 that is upstream of the connecting point of the pump placement flow path 9 to a flow path portion of the pump placement flow path 9 that extends between the vacuum pump P and the first shut-off valve V1.

A vacuum tank S is placed on the tank placement flow path 10. A fourth shut-off valve V4 is placed in a portion of the tank placement flow path 10 that is upstream of the vacuum tank S. A fifth shut-off valve V5 is placed in a portion of the tank placement flow path 10 that is downstream of the vacuum tank S.

Figure 3:
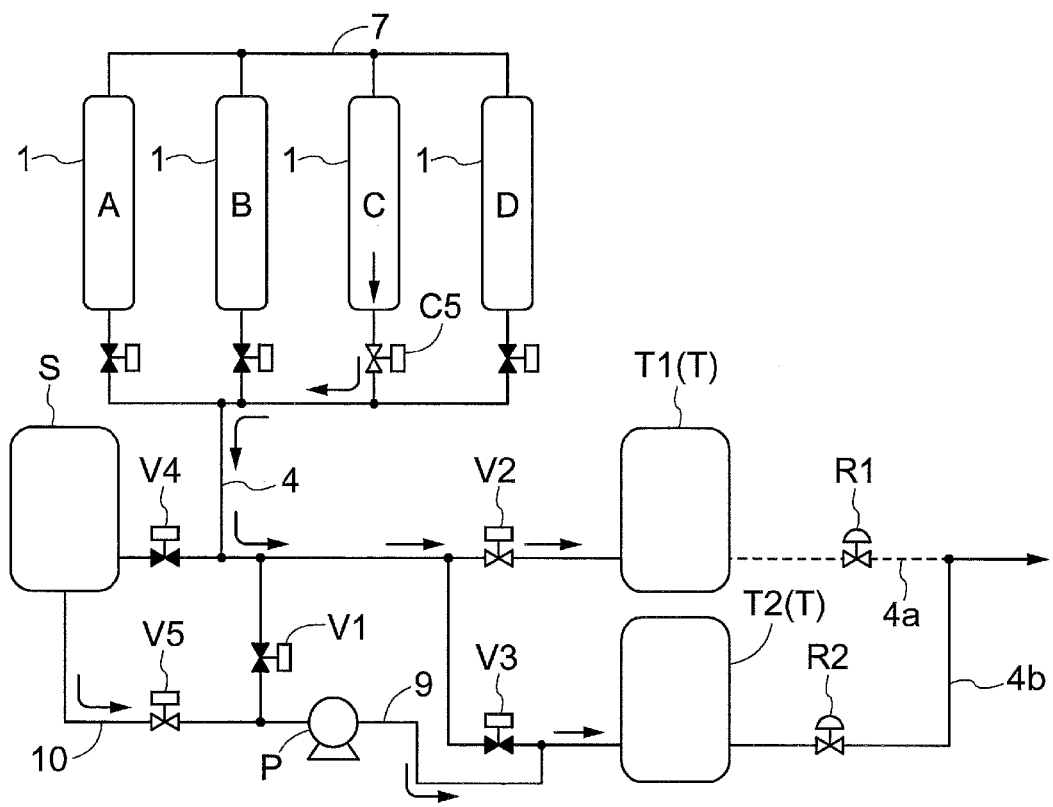
FIG. 3 is a diagram illustrating a first pressure-reducing step.

Accordingly, when the second shut-off valve V2, of the first to fifth shut-off valves V1 to V5, is opened, and the other shut-off valves are closed, as illustrated in FIG. 3, a first flowing state in which the off-gas from the adsorption column 1 is supplied to the burner 8 while being recovered into the first tank T1 can be created.

Incidentally, FIG. 3 illustrates a state in which in addition to the second shut-off valve V2, the fifth shut-off valve V5 is opened, and the vacuum pump P is operated to perform suctioning. As will be described later, a configuration is adopted in which the vacuum tank S is accurately adjusted to a negative pressure state by operating the vacuum pump P to perform suctioning of the vacuum tank S.

Figure 4:
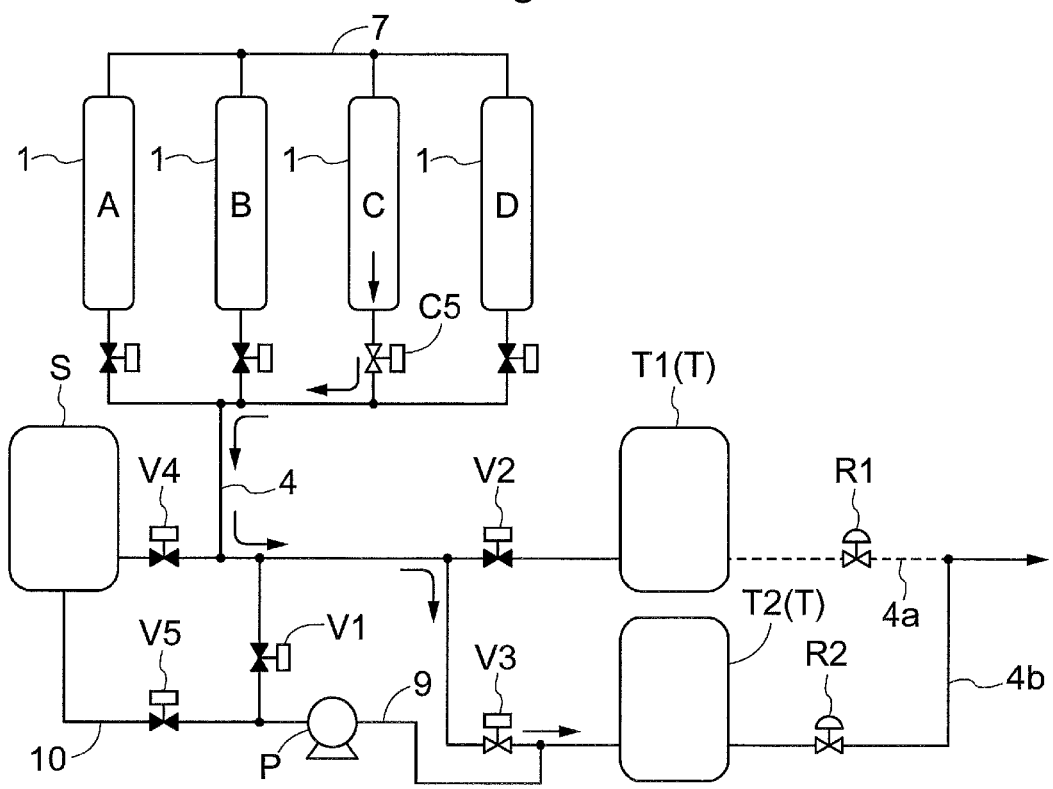
FIG. 4 is a diagram illustrating a second pressure-reducing step.

When the third shut-off valve V3, of the first to fifth shut-off valves V1 to V5, is opened, and the other shut-off valves are closed, as illustrated in FIG. 4, a second flowing state in which the off-gas from the adsorption column 1 is supplied to the burner 8 while being recovered into the second tank T2 can be created.

Figure 6:
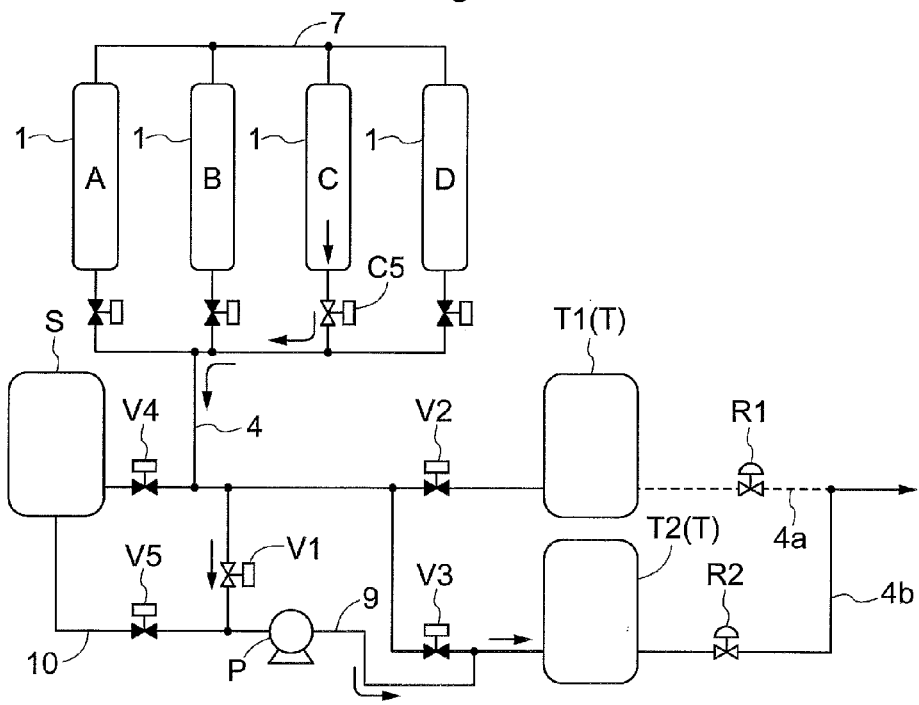
FIG. 6 is a diagram illustrating a pump suction step.

When the first shut-off valve V1, of the first to fifth shut-off valves V1 to V5, is opened, the other shut-off valves are closed, and the vacuum pump P is operated to perform suctioning, as illustrated in FIG. 6, a third flowing state in which suctioning of the adsorption column 1 is performed by the vacuum pump P, and the off-gas that is thus supplied by the vacuum pump P is supplied to the burner 8 while being recovered into the second tank T2 can be created.

Figure 5:
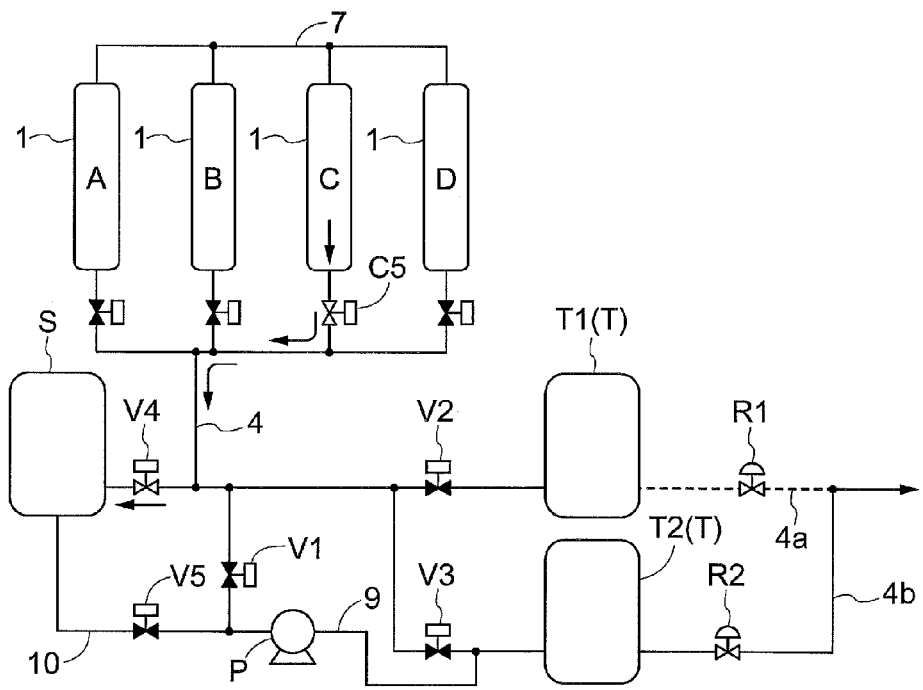
FIG. 5 is a diagram illustrating a tank suction step.

When the fourth shut-off valve V4, of the first to fifth shut-off valves V1 to V5, is opened, and the other shut-off valves are closed, as illustrated in FIG. 5, a fourth flowing state in which suctioning of the adsorption column 1 is performed by the vacuum tank S that is adjusted to the negative pressure state as will be described later, the off-gas from the adsorption column 1 is thus recovered into the vacuum tank S, and the off-gas that has been recovered into the first tank T1 and the second tank T2 is supplied to the burner 8 can be created.

Figure 7:
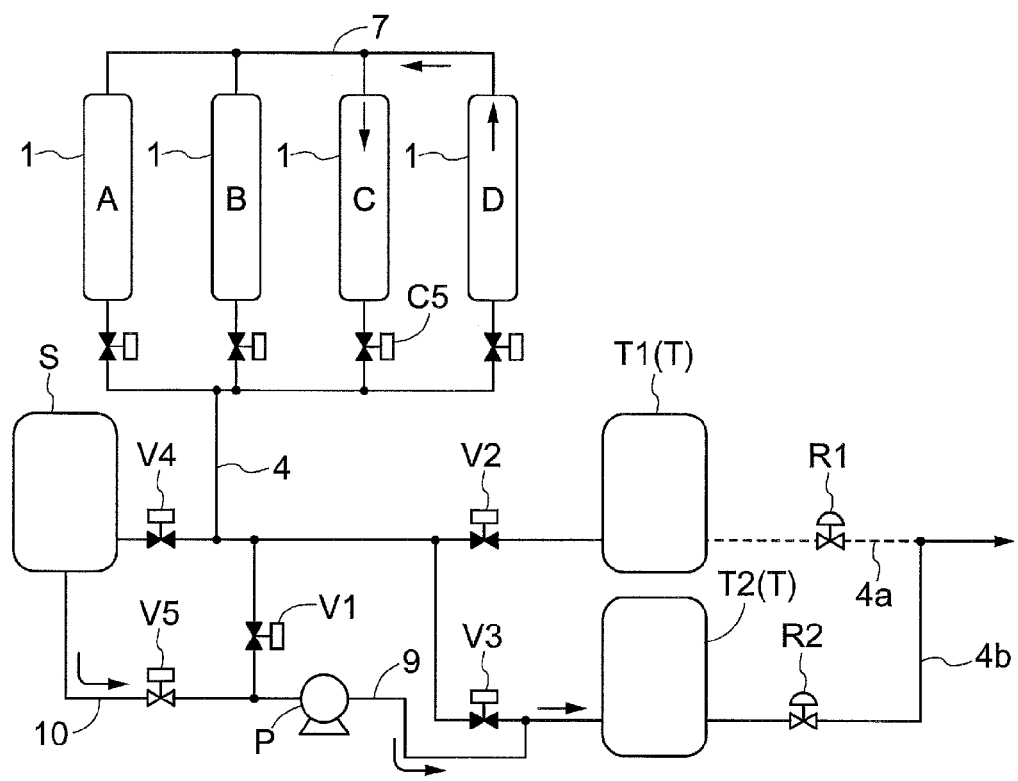
FIG. 7 is a diagram illustrating a downstream receiving step.
Figure 11:
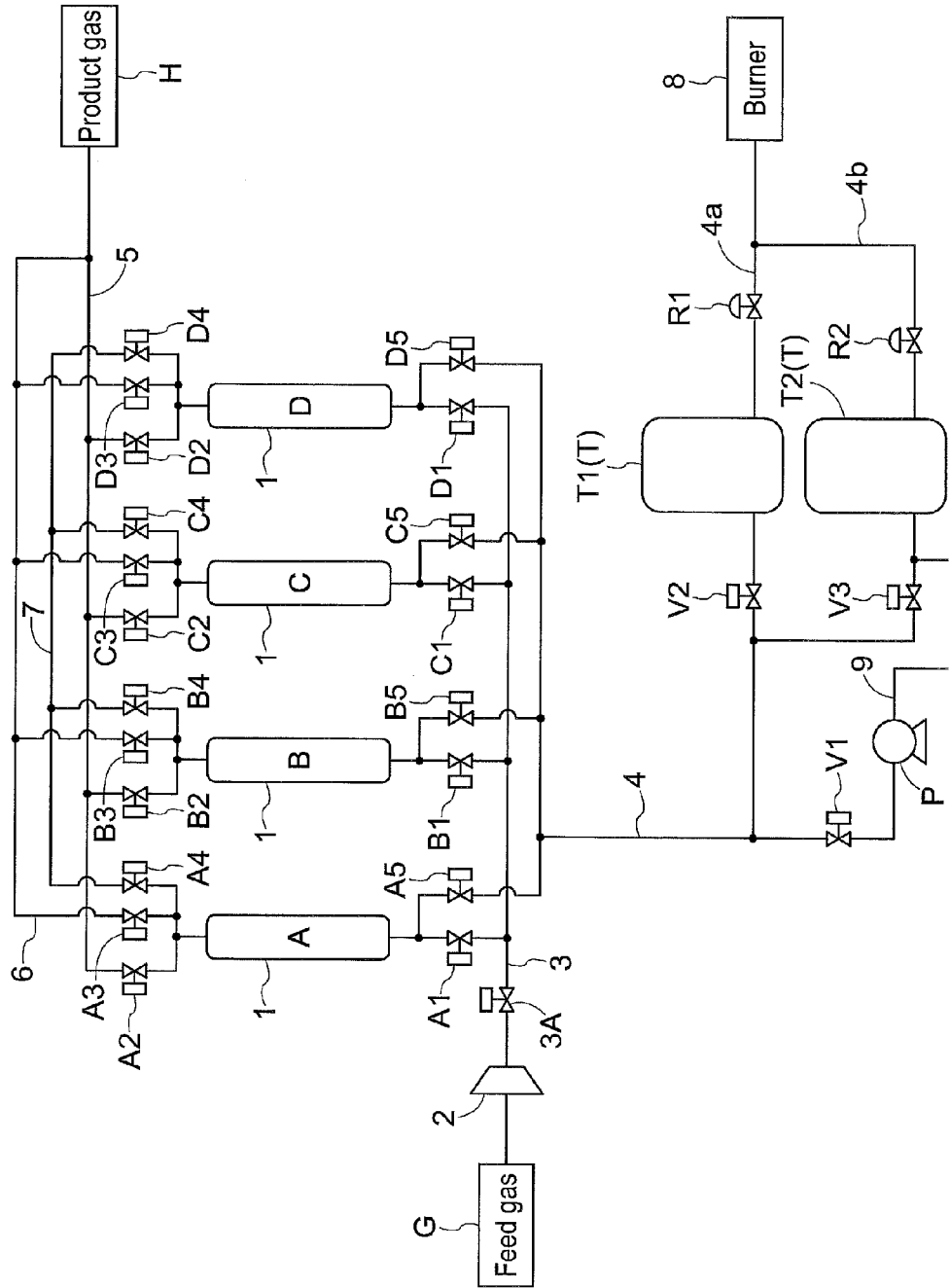
FIG. 11 is a diagram schematically showing an apparatus for performing a comparative method.
Figure 12:
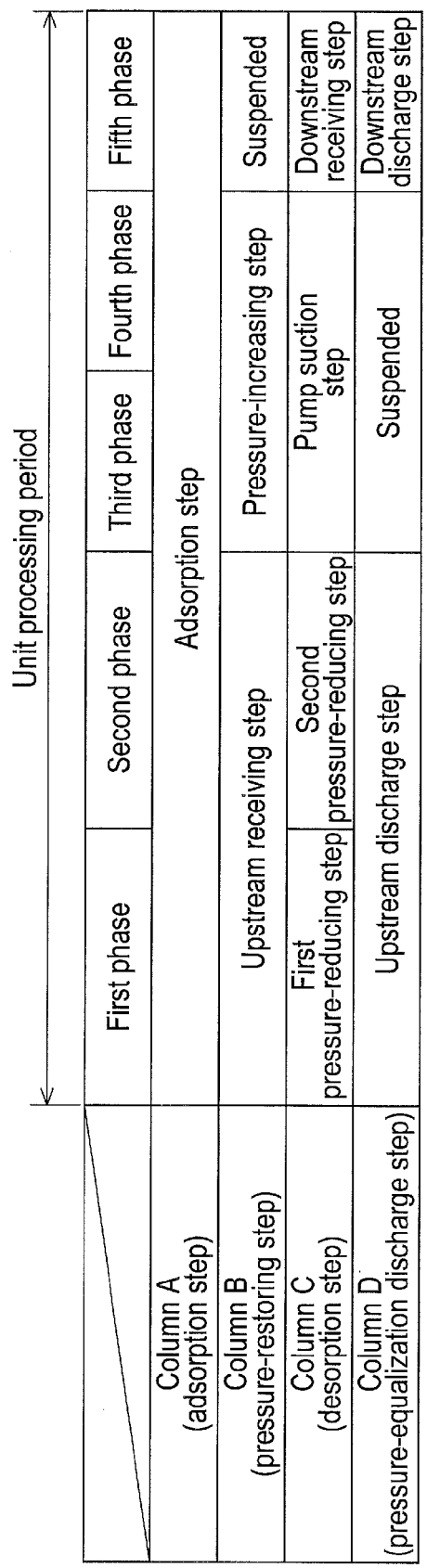
FIG. 12 is a diagram illustrating an operating cycle of the comparative method.
Figure 13:
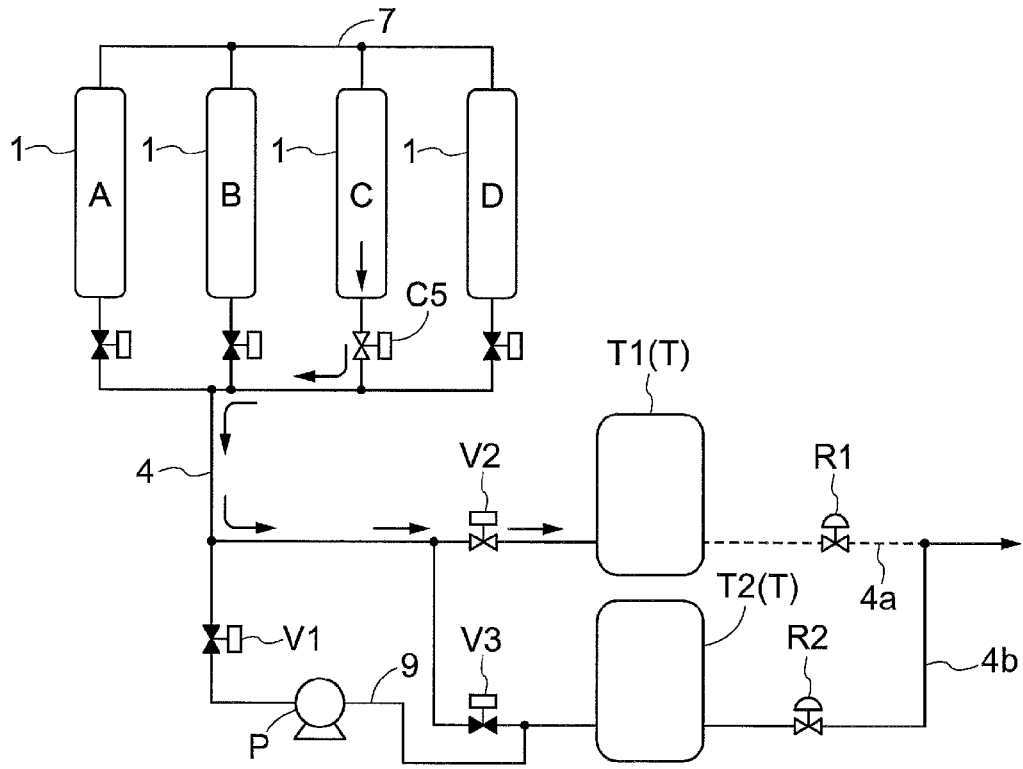
FIG. 13 is a diagram illustrating a first pressure-reducing step of the comparative method.
Figure 14:
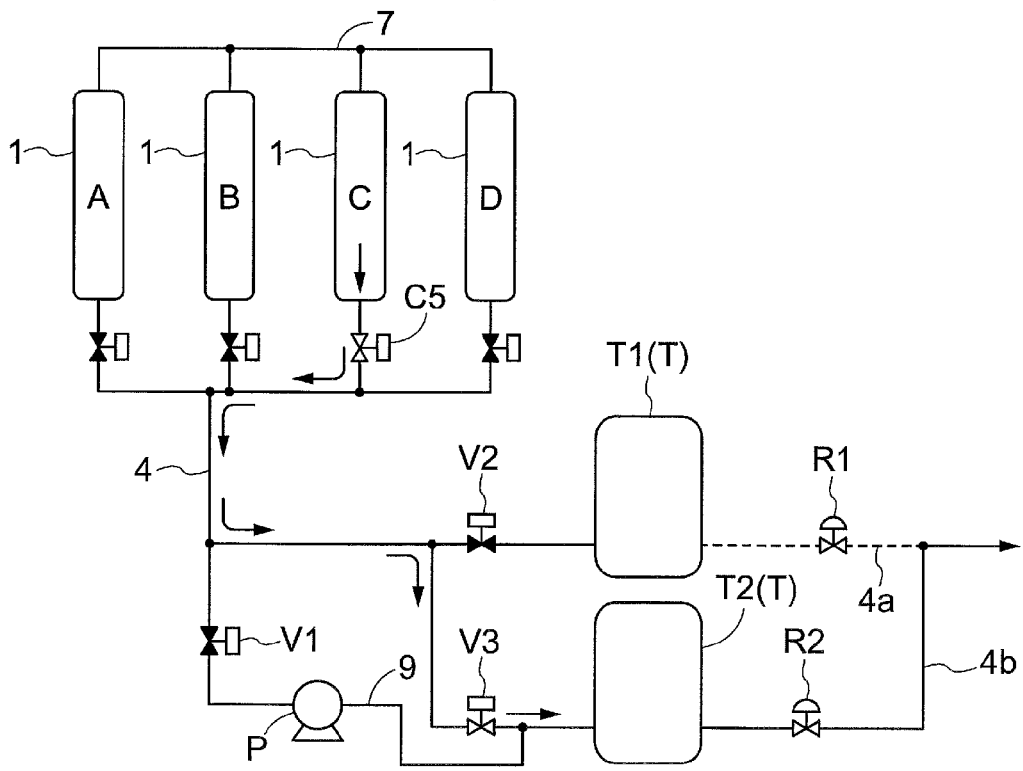
FIG. 14 is a diagram illustrating a second pressure-reducing step of the comparative method.
Figure 15:
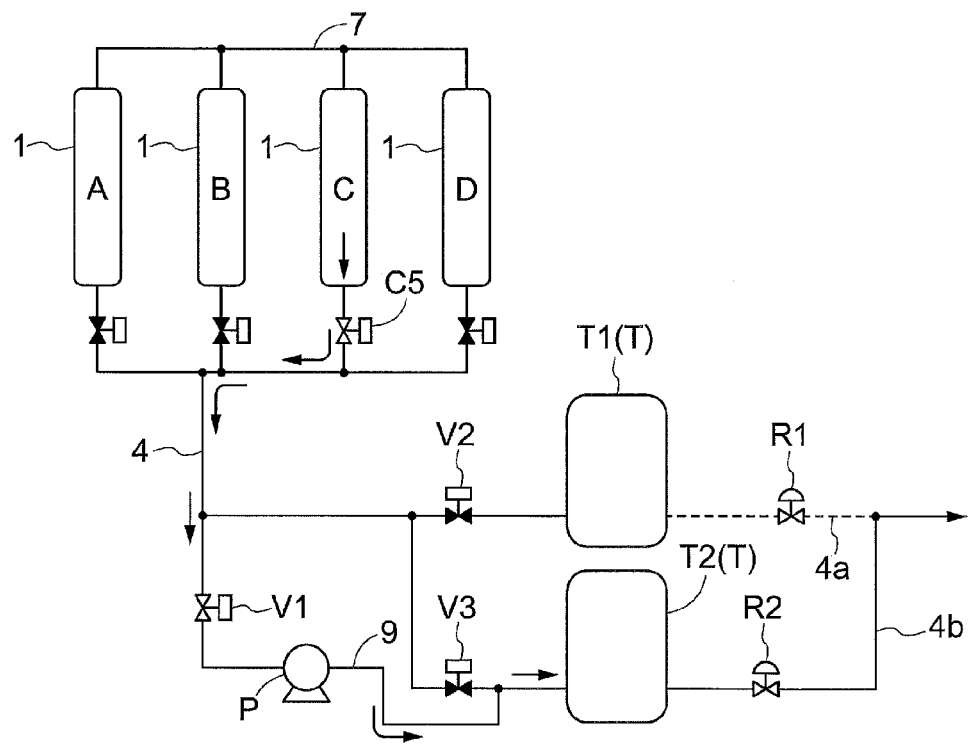
FIG. 15 is a diagram illustrating a pump suction step of the comparative method.
Figure 16:
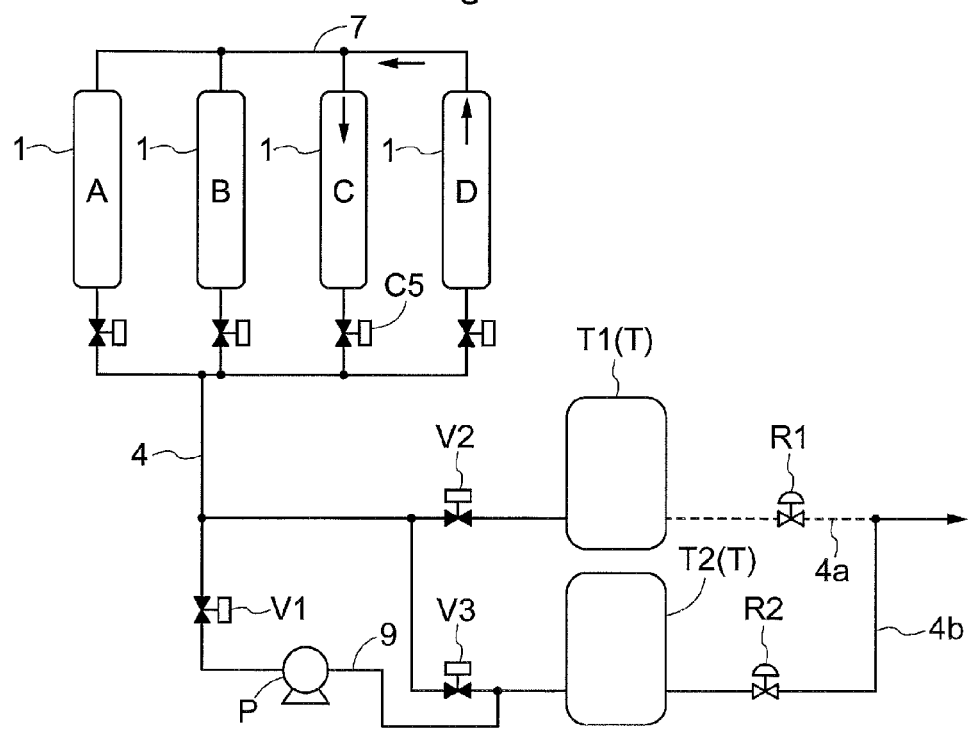
FIG. 16 is a diagram illustrating a downstream receiving step of the comparative method.
Figure 17:
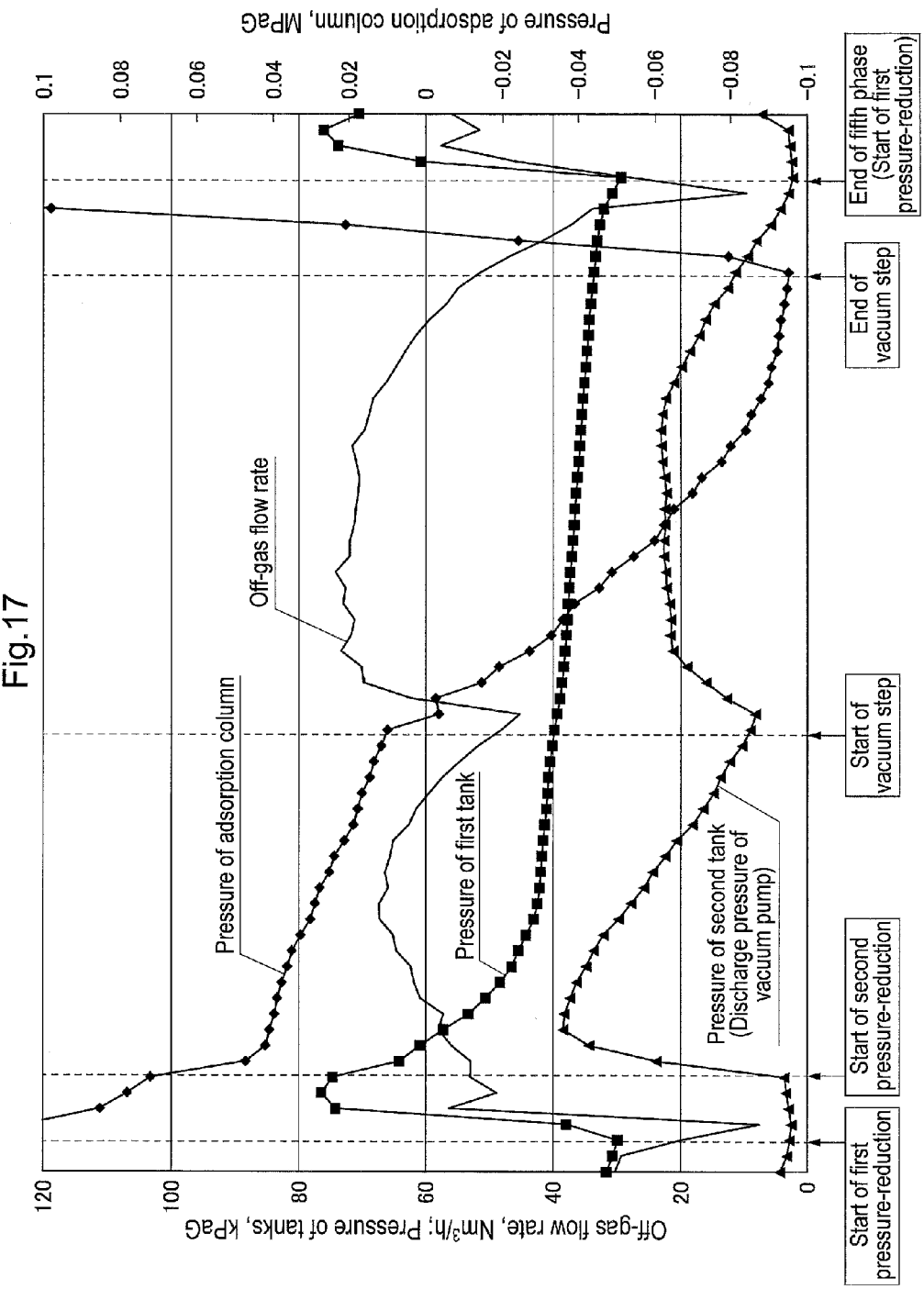
FIG. 17 is a graph illustrating changes in off-gas flow rate, changes in pressure of an adsorption column, and the like of the comparative method.

When the fifth shut-off valve V5, of the first to fifth shut-off valves V1 to V5, is opened, the other shut-off valves are closed, and the vacuum pump P is operated to perform suctioning, as illustrated in FIG. 7, a fifth flowing state in which the off-gas that has been recovered into the vacuum tank S is suctioned by the vacuum pump P, and the off-gas that is thus supplied by the vacuum pump P is supplied to the burner 8 while being recovered into the second tank T2 can be created.

Moreover, in this fifth flowing state, even after the off-gas that has been recovered into the vacuum tank S is discharged, the vacuum pump P continues suctioning of the vacuum tank S, and thus the vacuum tank S is adjusted to the negative pressure state.

Incidentally, in the present embodiment, the third flowing state corresponds to an adsorption column-operated state in which the vacuum pump P performs suctioning with respect to the adsorption column 1, and the fifth flowing state corresponds to a tank-operated state in which the vacuum pump P performs suctioning with respect to the vacuum tank S.

That is to say, according to the present embodiment, switching between the adsorption column-operated state and the tank-operated state can be performed by selectively opening/closing the first to fifth shut-off valves V1 to V5.

Moreover, in the present embodiment, the fourth flowing state corresponds to a communication state in which the vacuum tank S is allowed to communicate with the adsorption column 1, and the first to third and fifth flowing states correspond to a blocked state in which the communication between the vacuum tank S and the adsorption column 1 is blocked.

That is to say, according to the present embodiment, switching between the communication state and the blocked state can be performed by selectively opening/closing the first to fifth shut-off valves V1 to V5.

Moreover, in the present embodiment, similarly to the above-described comparative method, the first flow control valve R1 is installed in a portion of the first discharge path 4a that is downstream of the first tank T1, the second flow control valve R2 is installed in a portion of the second discharge path 4b that is downstream of the second tank, and excessive increases and decreases in flow rate of the off-gas supplied to the burner 8 is suppressed by the flow control of the first flow control valve R1 and the second flow control valve R2.

That is to say, in the first flowing state, the off-gas flow rate is controlled by the first flow control valve R1, and in the second to fifth flowing states, basically the off-gas flow rate is controlled by the second flow control valve R2, and when the off-gas flow rate is insufficient, the first flow control valve R1 is controlled so as to supplement the off-gas recovered into the first tank T1.

Operating Cycle of Method for Hydrogen Production by Pressure Swing Adsorption

According to the method for hydrogen production by pressure swing adsorption of the present embodiment, an operating cycle illustrated in FIG. 2 is performed.

Incidentally, although the adsorption step, the pressure-equalization discharge step, the desorption step, and the pressure-restoring step are performed successively in each of the four adsorption columns 1 in such a manner as to change to the next step each time a unit processing period has elapsed, the following describes a case where the adsorption step is performed in the column A of the four adsorption columns 1, the pressure-restoring step is performed in the column B, the desorption step is performed in the column C, and the pressure-equalization discharge step is performed in the column D.

That is to say, the feed gas supply valve A1 and the product gas delivery valve A2 corresponding to the column A are opened, and the adsorption step is performed in the column A for a unit processing period.

With respect to the pressure-equalization discharge step, in an initial stage of the unit processing period, an upstream discharge step of supplying the gas inside the column D in the pressure-equalization discharge step to the column B in the pressure-restoring step is performed, and in a final stage of the unit processing period, a downstream discharge step of supplying the gas inside the column D in the pressure-equalization discharge step to the column C in the desorption step is performed.

Incidentally, in the upstream discharge step and the downstream discharge step, the communication on-off valves A4, B4, C4, and D4 are selectively opened.

With respect to the desorption step, in the initial stage of the unit processing period, a pressure-reducing step of discharging the gas inside the column C in the desorption step into the off-gas tank T as the off-gas is performed as will be described later, in an intermediate stage of the unit processing period, a tank suction step (see FIG. 5) of performing suctioning of the column C in the desorption step using the vacuum tank S in the above-described fourth flowing state and a pump suction step (see FIG. 6) of performing suctioning of the column C in the desorption step using the vacuum pump P in the above-described third flowing state are performed successively, and in the final stage of the unit processing period, a downstream receiving step of receiving the gas supplied from the column D in the pressure-equalization discharge step by the downstream discharge step into the column C in the desorption step is performed (see FIG. 7).

According to the present embodiment, as the pressure-reducing step, a first pressure-reducing step (see FIG. 3) in which the column C in the desorption step and the first tank T1 are allowed to communicate with each other in the above-described first flowing state and a second pressure-reducing step (see FIG. 4) in which the column C in the desorption step and the second tank T2 are allowed to communicate with each other in the above-described second flowing state are performed successively. Subsequently, the tank suction step is performed.

Moreover, according to the present embodiment, in the final stage of the unit processing period, that is to say, when the downstream discharge step of the pressure-equalization discharge step and the downstream receiving step of the desorption step are performed, the discharge of the off-gas in the vacuum tank S into the second tank T2 and the adjustment of the vacuum tank S to the negative pressure state are performed in the fifth flowing state (see FIG. 7).

Furthermore, according to the present embodiment, in the initial stage of the unit processing period, when the first pressure-reducing step in which the column C in the desorption step and the first tank T1 are allowed to communicate with each other in the above-described first flowing state is performed, as illustrated in FIG. 3, the fifth flowing state is created so that the vacuum tank S is accurately adjusted to the negative pressure state.

With respect to the pressure-restoring step, in the initial stage of the unit processing period, an upstream receiving step of receiving the gas supplied from the column D in the pressure-equalization discharge step by the upstream discharge step into the column B in the pressure-restoring step is performed, and then a pressure-increasing step of receiving a portion of the product gas H generated in the column A in the adsorption step into the column B in the pressure-restoring step is performed.

Incidentally, to perform the pressure-increasing step, the product gas return valve B3 corresponding to the column B, of the product gas return valves A3, B3, C3, and D3, is opened.

Incidentally, according to the present embodiment, as illustrated in FIG. 2, the unit processing period is divided into first to fifth phases.

The upstream receiving step and the upstream discharge step are performed in the first and second phases, the pressure-increasing step is performed in the third and fourth phases, the tank suction step is performed in the third phase, the pump suction step is performed in the fourth phase, the first pressure-reducing step is performed in the first phase, the second pressure-reducing step is performed in the second phase, and the downstream receiving step and the downstream discharge step are performed in the fifth phase.

Moreover, with respect to the pressure-restoring step of the column B, in the fifth phase, the operation is in a suspended state in which no specific step is performed. Similarly, with respect to the pressure-equalization discharge step of the column D, in the third and fourth phases, the operation is in a suspended state in which no specific step is performed.

It should be noted that the temporal lengths of the first to fifth respective phases are not the same length, and may be set to lengths that are suitable for performing the various steps.

Consideration of Method for Hydrogen Production by Pressure Swing Adsorption

FIG. 8 illustrates changes in pressure of the first tank T1 and the second tank T2, changes in flow rate of the off-gas flowing through the off-gas discharge path 4 toward the burner 8, changes in pressure of the adsorption column 1 (column C), and changes in pressure of the vacuum tank S in the case where the method for hydrogen production by pressure swing adsorption of the present embodiment is performed. Incidentally, the pressure of the second tank T2 corresponds to the discharge pressure of the vacuum pump P.

It should be noted that in FIG. 8, the start of the first pressure-reducing step is described as "start of first pressure-reduction", the start of the second pressure-reducing step is described as "start of second pressure-reduction", the start of the tank suction step is described as "start of vacuum pressure-equalization", the start of the pump suction step is described as "start of vacuum step", and the end of the pump suction step is described as "end of vacuum step".

Incidentally, FIG. 8 illustrates the changes in the case where the internal pressure of the adsorption column 1 in the adsorption step is about 750 kPaG, and the internal pressure of the adsorption column 1 (column C) after the downstream discharge step is performed is about 150 kPaG.

It is shown that the internal pressure of the adsorption column 1 (column C) decreases from the pressure (about 150 kPaG) at the start of the desorption step to near about 70 kPaG after the first pressure-reducing step is performed, the internal pressure of the adsorption column 1 (column C) decreases to a value on the order of about 40 kPaG after the second pressure-reducing step is performed, the internal pressure of the adsorption column 1 (column C) decreases to a pressure lower than the atmospheric pressure after the tank suction step is performed, and the internal pressure of the adsorption column 1 (column C) decreases to near about −90 kPaG after the pump suction step is performed.

In FIG. 8, when attention is focused on the changes in the amount of off-gas, it can be seen that even after the start of the pump suction step, a sharp increase in the amount of off-gas is suppressed, and even in the final stage of the fifth phase of the unit processing period, a sufficiently large amount of off-gas is maintained.

The amount of off-gas does not sharply increase even after the start of the pump suction step because the vacuum pump P performs suctioning with respect to the adsorption column 1 (column C) in a state in which the internal pressure of the adsorption column 1 (column C) is lower than the atmospheric pressure.

Moreover, a sufficiently large amount of off-gas is maintained in the final stage of the fifth phase of the unit processing period because the off-gas recovered into the vacuum tank S in the tank suction step is discharged into the second tank in the fifth phase.

Incidentally, in the tank suction step, the off-gas recovered from the adsorption column 1 (column C) is not discharged to the off-gas discharge path 4. However, in the third phase in which the tank suction step is performed, the off-gas recovered into the first tank T1 and the second tank T2 in the first phase and the second phase is caused to flow in the off-gas discharge path 4, and thus the amount of off-gas is prevented from decreasing.

Another Embodiment

Next, another embodiment of the method for hydrogen production by pressure swing adsorption will be described. It is to be understood that the other embodiment is given to describe a modification of the operating cycle according to the above-described embodiment, and basic components thereof are the same as those of the above-described embodiment. Thus, in the following description, the differences from the above-described embodiment will be described in detail.

In the method for hydrogen production by pressure swing adsorption of the other embodiment, an operating cycle illustrated in FIG. 9 is performed.

Incidentally, although the adsorption step, the pressure-equalization discharge step, the desorption step, and the pressure-restoring step are performed successively in each of the four adsorption columns 1 in such a manner as to change to the next step each time the unit processing period has elapsed, the following describes a case where the adsorption step is performed in the column A of the four adsorption columns 1, the pressure-restoring step is performed in the column B, the desorption step is performed in the column C, and the pressure-equalization discharge step is performed in the column D.

In the other embodiment, the adsorption step, the pressure-restoring step, and the pressure-equalization discharge step are performed in the same manner as in the above-described embodiment, but the desorption step is performed differently from that of the above-described embodiment.

Moreover, in the other embodiment, similarly to the above-described embodiment, in the final stage of the unit processing period, that is to say, when the downstream discharge step of the pressure-equalization discharge step and the downstream receiving step of the desorption step are performed, the discharge of the off-gas in the vacuum tank S into the second tank T2 and the adjustment of the vacuum tank S to the negative pressure state are performed in the fifth flowing state (see FIG. 7).

Desorption Step of the Other Embodiment

Hereinafter, the desorption step of the other embodiment will be described.

That is to say, with respect to the desorption step, in an initial stage of the unit processing period, the pressure-reducing step of discharging the gas inside the column C in the desorption step into the off-gas tank T as off-gas is performed, in an intermediate stage of the unit processing period, the tank suction step (see FIG. 5) of performing suctioning of the column C in the desorption step using the vacuum tank S in the above-described fourth flowing state and the pump suction step (see FIG. 6) of performing suctioning of the column C in the desorption step using the vacuum pump P in the above-described third flowing state are performed successively, and in a final stage of the unit processing period, the downstream receiving step of receiving the gas supplied from the column D in the pressure-equalization discharge step by the downstream discharge step into the column C in the desorption step is performed (see FIG. 7).

According to the other embodiment, as the pressure-reducing step, a step (see FIG. 3) in which the column C in the desorption step and the first tank T1 are allowed to communicate with each other in the above-described first flowing state is performed, and the tank suction step is performed subsequently to this pressure-reducing step.

Moreover, a configuration is adopted in which the internal pressure of the column C in the desorption step is reduced from an initial pressure at the start of the desorption step to a pressure between 40 and 60% of the initial pressure by the pressure-reducing step.

Furthermore, according to the other embodiment, a configuration is adopted in which in the initial stage of the unit processing period, when the pressure-reducing step in which the column C in the desorption step and the first tank T1 are allowed to communicate with each other in the above-described first flowing state is performed, the vacuum tank S is accurately adjusted to the negative pressure state by performing suctioning of the vacuum tank S using the vacuum pump P as illustrated in FIG. 3.

Incidentally, according to the other embodiment, the second pressure-reducing step of the above-described embodiment is omitted, and thus the fourth shut-off valve V4 and an upstream portion of the second discharge path 4b on which the fourth shut-off valve V4 is placed can be omitted.

It should be noted that the upstream portion of the second discharge path 4b refers to a portion of the second discharge path 4b that is upstream of the connecting point of the pump placement flow path 9.

In the other embodiment as well, the unit processing period is divided into first to fifth phases as illustrated in FIG. 9.

Moreover, the other embodiment is the same as the above-described embodiment in that the upstream receiving step and the upstream discharge step are performed in the first and second phases, the pressure-increasing step is performed in the third and fourth phases, the downstream receiving step and the downstream discharge step are performed in the fifth phase.

In addition, the other embodiment is also the same as the above-described embodiment in that with respect to the pressure-restoring step of the column B, in the fifth phase, the operation is in a suspended state in which no specific step is performed, and similarly, with respect to the pressure-equalization discharge step of the column D, in the third and fourth phases, the operation is in a suspended state in which no specific step is performed.

According to the other embodiment, the pressure-reducing step is performed in the first phase, the tank suction step is performed in the second phase, and the pump suction step is performed in the third and fourth phases.

It should be noted that the temporal lengths of the first to fifth respective phases are not the same length, and may be set to lengths that are suitable for performing the various steps.

Consideration of Method for Hydrogen Production by Pressure Swing Adsorption of the Other Embodiment FIG. 10 illustrates changes in pressure of the first tank T1 and the second tank T2, changes in flow rate of the off-gas flowing through the off-gas discharge path 4 toward the burner 8, changes in pressure of the adsorption column 1 (column C), and changes in pressure of the vacuum tank S in the case where the method for hydrogen production by pressure swing adsorption of the other embodiment is performed.

It should be noted that in FIG. 10, the start of the pressure-reducing step is described as "start of pressure-reduction", the start of the tank suction step is described as "start of vacuum pressure-equalization", the start of the pump suction step is described as "start of vacuum step", and the end of the pump suction step is described as "end of vacuum step".

Incidentally, FIG. 10 illustrates the changes in the case where the internal pressure of the adsorption column 1 in the adsorption step is 750 kPaG, and the internal pressure of the adsorption column 1 (column C) after the downstream discharge step is performed is 150 kPaG.

Moreover, the internal pressure of the adsorption column 1 (column C) decreases from the initial pressure (150 kPaG) at the start of the desorption step to 70 kPaG, that is to say, a pressure between 40 and 60% of the initial pressure after the pressure-reducing step is performed.

Also, it is shown that the internal pressure of the adsorption column 1 (column C) becomes lower than the atmospheric pressure after the tank suction step is performed subsequently to the pressure-reducing step, and the internal pressure of the adsorption column 1 (column C) decreases to near −90 kPaG after the pump suction step is performed.

In FIG. 10, when attention is focused on changes in the amount of off-gas, it can be seen that even after the start of the pump suction step, a sharp increase in the amount of off-gas is suppressed, and also in the final stage of the fifth phase of the unit processing period, a sufficiently large amount of off-gas is maintained.

The amount of off-gas does not sharply increase even after the start of the pump suction step because the vacuum pump P performs suctioning with respect to the adsorption column 1 (column C) in a state in which the internal pressure of the adsorption column 1 (column C) is lower than the atmospheric pressure.

Moreover, a sufficiently large amount of off-gas is maintained in the final stage of the fifth phase of the unit processing period because the off-gas that has been recovered into the vacuum tank S in the tank suction step is supplied via the second tank T2 in the fifth phase.

Improved Configuration of Vacuum Tank

Next, an improved configuration of the vacuum tank S will be described.

That is to say, the vacuum tank S is packed with an off-gas adsorbent for adsorbing the off-gas discharged from the adsorption columns 1.

Specifically, since the feed gas contains hydrogen as well as methane as a flammable component other than hydrogen, carbon monoxide, nitrogen, carbon dioxide, and moisture, the adsorbent packed in the adsorption columns 1 is configured to contain zeolite that adsorbs carbon monoxide and nitrogen, a carbon molecular sieve that adsorbs methane and carbon dioxide, and activated alumina that absorbs moisture, as described above.

In contrast, since the off-gas may sometimes contain up to about 70% of methane and carbon dioxide, an off-gas adsorbent constituted by a carbon molecular sieve that adsorbs methane and carbon dioxide is packed in the vacuum tank S.

When the vacuum tank S is packed with the off-gas adsorbent, the off-gas discharged from the adsorption column 1 is adsorbed onto the off-gas adsorbent when introduced into the vacuum tank S, and the off-gas adsorbed onto the off-gas adsorbent is released from the off-gas adsorbent and discharged from the vacuum tank S when the vacuum pump P performs suctioning of the vacuum tank S.

That is to say, since the vacuum tank is repeatedly switched between a state in which a low pressure is created in the vacuum tank due to suctioning of the vacuum tank by the vacuum pump P and a state in which a high pressure is created in the vacuum tank due to introduction of the off-gas discharged from the adsorption column 1 into the vacuum tank, when the vacuum tank S is packed with the off-gas adsorbent, the off-gas discharged from the adsorption column 1 is adsorbed onto the off-gas adsorbent when introduced into the vacuum tank S.

Moreover, the off-gas adsorbed onto the off-gas adsorbent is released from the off-gas adsorbent and discharged from the vacuum tank S when the vacuum pump P performs suctioning of the vacuum tank S.

As described above, the off-gas discharged from the adsorption columns 1 is stored in the vacuum tank S in a state in which the off-gas is adsorbed onto the off-gas adsorbent. Thus, even when the volume of the vacuum tank S is reduced as compared with the case where no off-gas adsorbent is packed therein, a predetermined amount of off-gas can be stored in the vacuum tank S. Therefore, the size of the vacuum tank S can be reduced.

That is to say, methane and carbon dioxide contained in the off-gas are adsorbed onto the off-gas adsorbent, and as a result, even when the volume of the vacuum tank S is reduced (for example, reduced by about 60%) as compared with the case where no off-gas adsorbent is packed therein, the predetermined amount of off-gas can be recovered into the vacuum tank S.

Other Embodiments

Next, other embodiments will be listed below.

(1) In the embodiment described above, a case where, during the first pressure-reducing step of the desorption step, suctioning of the vacuum tank S in the blocked state is performed by the vacuum pump P that has been switched to the tank-operated state was described as an example. However, this operation may be omitted.

(2) In the other embodiment described above, a case where, during the pressure-reducing step of the desorption step, suctioning of the vacuum tank S in the blocked state is performed using the vacuum pump P that has been switched to the tank-operated state was described as an example. However, this operation may be omitted.

(3) In the embodiment and the other embodiment described above, a case where the feed gas contains hydrogen as well as methane as the flammable component other than hydrogen gas, carbon dioxide, carbon monoxide, and nitrogen was described as an example. However, the method for hydrogen production by pressure swing adsorption of the present invention is applicable to various types of feed gases containing hydrogen and a flammable component other than the hydrogen component.

(4) In the embodiment and the other embodiment described above, the apparatus including the four adsorption columns 1 was described as the apparatus for performing the method for hydrogen production by pressure swing adsorption of the present invention. However, it is also possible that the apparatus for performing the method for hydrogen production by pressure swing adsorption of the present invention includes four or more adsorption columns 1, and the method for hydrogen production by pressure swing adsorption of the present invention is performed in such a manner that the adsorption step, the pressure-equalization discharge step, the desorption step, and the pressure-restoring step are performed in specific four adsorption columns 1 of those adsorption columns 1.

(5) With respect to the above-described improved configuration of the vacuum tank S, a case where the vacuum tank S is packed with the off-gas adsorbent constituted by the carbon molecular sieve that adsorbs methane and carbon dioxide was described as an example. However, similarly to the adsorption columns 1, the vacuum tank S may also be packed with, as the off-gas adsorbent, zeolite that adsorbs carbon monoxide and nitrogen, a carbon molecular sieve that adsorbs methane and carbon dioxide, and activated alumina that adsorbs moisture.

REFERENCE SIGNS LIST

1 Adsorption column
8 Burner (Combustion device)
P Vacuum pump
S Vacuum tank
T Off-gas tank
T1 First tank
T2 Second tank

The invention claimed is:
1. A method for hydrogen production by pressure swing adsorption, comprising:
providing four adsorption columns for generating a product gas from a feed gas containing a hydrogen component and a flammable component other than the hydrogen component by causing an adsorption target component other than the hydrogen component to be adsorbed onto an adsorbent, and an off-gas tank into which an off-gas discharged from the adsorption columns is recovered and from which the recovered off-gas is supplied to a combustion device;
performing an adsorption step for a unit processing period in one of the four adsorption columns, performing a pressure-equalization discharge step for the unit processing period in the adsorption column in which the step subsequent to the adsorption step is performed, performing a desorption step for the unit processing period in the adsorption column in which the step subsequent to the pressure-equalization discharge step is performed, performing a pressure-restoring step as a pre-step of the adsorption step for the unit processing period in the adsorption column in which the step subsequent to the desorption step is performed, and recovering the off-gas discharged from the adsorption column in which the desorption step is performed into the off-gas tank;

providing a vacuum pump for supplying the off-gas suctioned from the adsorption column to the combustion device, the vacuum pump being switchable between an adsorption column-operated state in which the vacuum pump performs suctioning with respect to the adsorption column and a tank-operated state in which the vacuum pump performs suctioning with respect to a vacuum tank;

wherein the vacuum tank is provided so as to be switchable between a communication state in which the vacuum tank is in communication with the adsorption column and a blocked state in which the communication with the adsorption column is blocked, wherein with respect to the pressure-equalization discharge step, in an initial stage of the unit processing period, an upstream discharge step of supplying a gas inside the adsorption column in the pressure-equalization discharge step to the adsorption column in the pressure-restoring step is performed, and in a final stage of the unit processing period, a downstream discharge step of supplying the gas inside the adsorption column in the pressure-equalization discharge step to the adsorption column in the desorption step is performed, wherein in the final stage of the unit processing period, suctioning of the vacuum tank switched to the blocked state is performed using the vacuum pump switched to the tank-operated state, thereby discharging the off-gas in the vacuum tank and adjusting the vacuum tank to a negative pressure state, wherein with respect to the desorption step, in the initial stage of the unit processing period, a pressure-reducing step of discharging a gas inside the adsorption column in the desorption step into the off-gas tank as the off-gas is performed, in an intermediate stage of the unit processing period, a tank suction step of switching the vacuum tank adjusted to the negative pressure state to the communication state and suctioning the gas inside the adsorption column in the desorption step into the vacuum tank and a pump suction step of switching the vacuum tank to the blocked state and performing suctioning of the adsorption column in the desorption step using the vacuum pump switched to the adsorption column-operated state are performed successively, and in the final stage of the unit processing period, a downstream receiving step of receiving the gas supplied from the adsorption column in the pressure-equalization discharge step by the downstream discharge step into the adsorption column in the desorption step is performed, and wherein with respect to the pressure-restoring step, in the initial stage of the unit processing period, an upstream receiving step of receiving the gas supplied from the adsorption column in the pressure-equalization discharge step by the upstream discharge step into the adsorption column in the pressure-restoring step is performed, and then a pressure-increasing step of receiving a portion of the product gas generated in the adsorption column in the adsorption step into the adsorption column in the pressure-restoring step is performed.

2. The method for hydrogen production by pressure swing adsorption according to claim 1, wherein a first tank and a second tank are provided as the off-gas tank, and wherein as the pressure-reducing step, a first pressure-reducing step in which the adsorption column in the desorption step and the first tank are allowed to communicate with each other and a second pressure-reducing step in which the adsorption column in the desorption step and the second tank are allowed to communicate with each other are performed successively, and the tank suction step is subsequently performed.

3. The method for hydrogen production by pressure swing adsorption according to claim 2, wherein the vacuum pump is configured to supply the off-gas to the second tank.

4. The method for hydrogen production by pressure swing adsorption according to claim 2, wherein when the first pressure-reducing step is performed, suctioning of the vacuum tank in the blocked state is performed using the vacuum pump switched to the tank-operated state.

5. The method for hydrogen production by pressure swing adsorption according to claim 1, wherein an internal pressure of the adsorption column in the desorption step is reduced from an initial pressure at the start of the desorption step to a pressure between 40 and 60% of the initial pressure by the pressure-reducing step, and wherein the tank suction step is performed subsequently to the pressure-reducing step.

6. The method for hydrogen production by pressure swing adsorption according to claim 5, wherein when the pressure-reducing step is performed, suctioning of the vacuum tank in the blocked state is performed using the vacuum pump switched to the tank-operated state.

7. The method for hydrogen production by pressure swing adsorption according to claim 5, wherein a first tank that, in the pressure-reducing step, is connected to the adsorption column in the desorption step and a second tank are provided as the off-gas tank, and wherein the vacuum pump is configured to supply the off-gas to the second tank.

8. The method for hydrogen production by pressure swing adsorption according claim 1, wherein the vacuum tank is packed with an off-gas adsorbent that adsorbs the off-gas discharged from the adsorption column.

9. The method for hydrogen production by pressure swing adsorption according to claim 8, wherein the feed gas is generated by reforming a gas to be processed containing methane as a main component so that the feed gas contains a hydrogen component as well as methane as a flammable component other than the hydrogen component, carbon monoxide, nitrogen, carbon dioxide, and moisture, wherein the adsorbent packed in the adsorption columns is configured to contain zeolite that adsorbs carbon monoxide and nitrogen, a carbon molecular sieve that adsorbs methane and carbon dioxide, and activated alumina that adsorbs moisture, and wherein the off-gas adsorbent is a carbon molecular sieve that adsorbs methane and carbon dioxide.

10. The method for hydrogen production by pressure swing adsorption according to claim 3, wherein when the first pressure-reducing step is performed, suctioning of the vacuum tank in the blocked state is performed using the vacuum pump switched to the tank-operated state.

11. The method for hydrogen production by pressure swing adsorption according to claim 6,
wherein a first tank that, in the pressure-reducing step, is connected to the adsorption column in the desorption step and a second tank are provided as the off-gas tank, and
wherein the vacuum pump is configured to supply the off-gas to the second tank.

12. The method for hydrogen production by pressure swing adsorption according to claim 2,
wherein the vacuum tank is packed with an off-gas adsorbent that adsorbs the off-gas discharged from the adsorption column.

13. The method for hydrogen production by pressure swing adsorption according to claim 3,
wherein the vacuum tank is packed with an off-gas adsorbent that adsorbs the off-gas discharged from the adsorption column.

14. The method for hydrogen production by pressure swing adsorption according to claim 4,
wherein the vacuum tank is packed with an off-gas adsorbent that adsorbs the off-gas discharged from the adsorption column.

15. The method for hydrogen production by pressure swing adsorption according to claim 5,
wherein the vacuum tank is packed with an off-gas adsorbent that adsorbs the off-gas discharged from the adsorption column.

16. The method for hydrogen production by pressure swing adsorption according to claim 6,
wherein the vacuum tank is packed with an off-gas adsorbent that adsorbs the off-gas discharged from the adsorption column.

17. The method for hydrogen production by pressure swing adsorption according to claim 7,
wherein the vacuum tank is packed with an off-gas adsorbent that adsorbs the off-gas discharged from the adsorption column.

* * * * *